US008642205B2

(12) United States Patent
Maleki et al.

(10) Patent No.: US 8,642,205 B2
(45) Date of Patent: Feb. 4, 2014

(54) ELECTROCHEMICAL BATTERY PACK WITH REDUCED MAGNETIC FIELD EMISSION AND CORRESPONDING DEVICES

(75) Inventors: Hossein Maleki, Lawrenceville, GA (US); Jerald A. Hallmark, Sugar Hill, GA (US)

(73) Assignee: Motorola Mobility LLC, Libertyville, IL (US)

( * ) Notice: Subject to any disclaimer, the term of this patent is extended or adjusted under 35 U.S.C. 154(b) by 424 days.

(21) Appl. No.: 12/853,055

(22) Filed: Aug. 9, 2010

(65) Prior Publication Data

US 2012/0033845 A1 Feb. 9, 2012

(51) Int. Cl.
*H01M 2/02* (2006.01)
*H01M 2/22* (2006.01)
*H01M 2/30* (2006.01)

(52) U.S. Cl.
USPC .......................... 429/158; 429/121; 429/178

(58) Field of Classification Search
USPC ......... 429/3, 121, 149, 158, 53, 162, 176, 94, 429/61, 178; 381/386
See application file for complete search history.

(56) References Cited

U.S. PATENT DOCUMENTS

| | | | |
|---|---|---|---|
| 1,712,026 A | 5/1929 | Clark | |
| 4,761,352 A | 8/1988 | Bakos et al. | |
| 5,300,373 A | 4/1994 | Shackle | |
| 5,986,355 A | 11/1999 | Rosen | |
| 5,991,420 A | 11/1999 | Stern | |
| 6,031,923 A | 2/2000 | Gnecco et al. | |
| 6,104,021 A | 8/2000 | Ogawa | |
| 6,546,109 B1 | 4/2003 | Gnecco et al. | |
| 6,574,111 B1 | 6/2003 | Gyenes et al. | |
| 6,808,843 B2 | 10/2004 | von During | |
| 2002/0195990 A1 | 12/2002 | Yang | |
| 2003/0027039 A1* | 2/2003 | Benson et al. ................. 429/158 |
| 2004/0038123 A1* | 2/2004 | Hisamitsu et al. ............. 429/147 |
| 2005/0031945 A1* | 2/2005 | Morita et al. .................. 429/158 |

(Continued)

FOREIGN PATENT DOCUMENTS

| | | |
|---|---|---|
| EP | 2325932 | 5/2011 |
| JP | 2000348757 | 12/2000 |

(Continued)

OTHER PUBLICATIONS

Patent Cooperation Treaty, International Search Report and Written Opinion of the International Searching Authority for International Application No. PCT/US2011/044921, Oct. 14, 2011, 12 pages.
"PCT Search Report", IA No. PCT/US2011/051749; Filed Sep. 15, 2011; Mailed Dec. 22, 2011.
Giel-Barragan Ramos, Cecilia "PCT Search Report and Opinion", Filed: Mar. 29, 2011 Priority Date: Apr. 23, 2010 Application: PCT?US2011/030258.
Sanyo, "SGS t32 Cell".
Chan, Heng M., "NonFinal OA", U.S. Appl. No. 12/766,023, filed Apr. 23, 2010; Mailed Jan. 30, 2013.

*Primary Examiner* — Kenneth Douyette

(57) ABSTRACT

A battery pack with reduced magnetic field emissions includes a plurality of cells (1301,1302) coupled electrically together by a first electrical conductor (1307) and a second electrical conductor (1308). The first electrical conductor (1307) couples positive terminals (1305,1306) to a terminal block (1311), while the second electrical conductor (1308) couples the negative terminals (1303,1304) to the terminal block (1311). Each cell (1301,1302) contains an asymmetrical internal electrode construction (1313,1314) having electrical tabs (502,503) coupled to a cathode and anode. The cells (1301,1302) can be arranged with their corresponding asymmetrical internal electrode constructions (1313,1314) oriented in different directions to reduce magnetic field emissions. The first electrical conductor (1307) and second electrical conductor (1308) can be routed such that magnetic fields generated by discharge currents tend to reduce other magnetic fields produced by other components within the battery pack.

14 Claims, 17 Drawing Sheets

(56) References Cited

U.S. PATENT DOCUMENTS

| | | |
|---|---|---|
| 2005/0069759 A1* | 3/2005 | Shimamura et al. ............ 429/53 |
| 2007/0026318 A1 | 2/2007 | Kishi et al. |
| 2007/0269685 A1* | 11/2007 | Chu et al. .......................... 429/3 |
| 2009/0029240 A1 | 1/2009 | Gardner et al. |
| 2010/0316896 A1 | 12/2010 | Van Schyndel et al. |
| 2011/0014942 A1 | 1/2011 | Van Schyndel et al. |
| 2011/0020673 A1 | 1/2011 | Van Schyndel |
| 2011/0111267 A1 | 5/2011 | Van Schyndel |
| 2011/0262787 A1 | 10/2011 | Maleki et al. |
| 2011/0262798 A1* | 10/2011 | Neumann et al. ............. 429/149 |

FOREIGN PATENT DOCUMENTS

| | | |
|---|---|---|
| JP | 2007/220372 | 8/2007 |
| JP | 2007220372 | 8/2007 |
| WO | WO-2010/003979 | 1/2010 |

\* cited by examiner

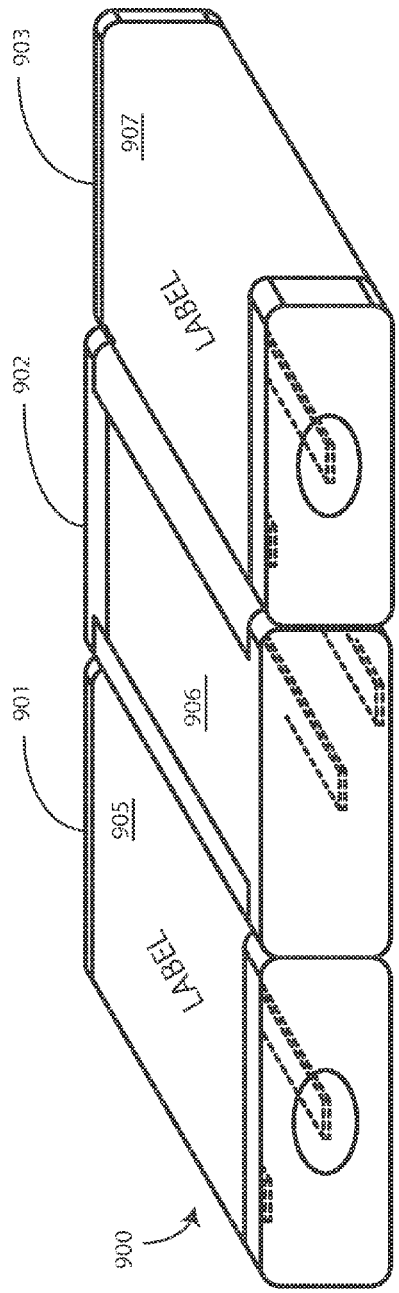
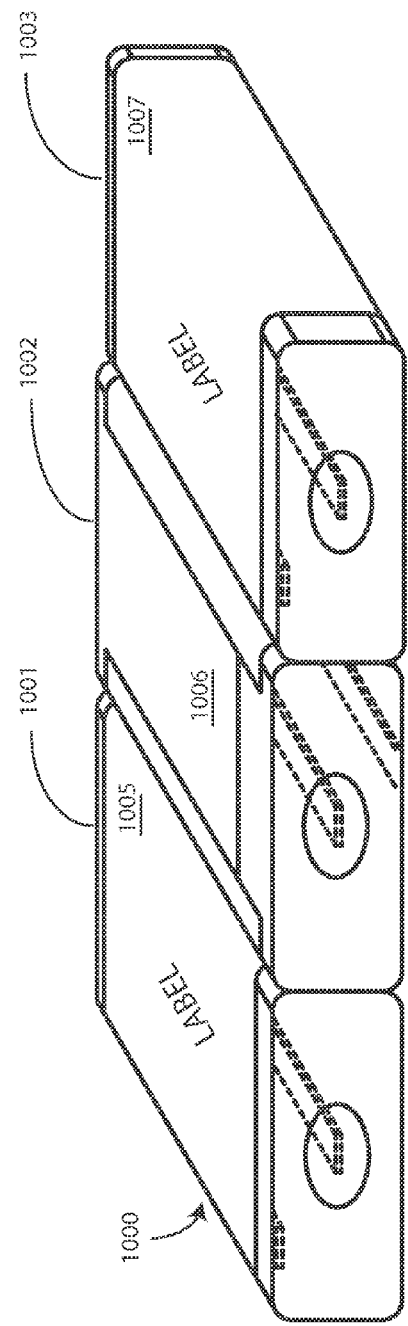

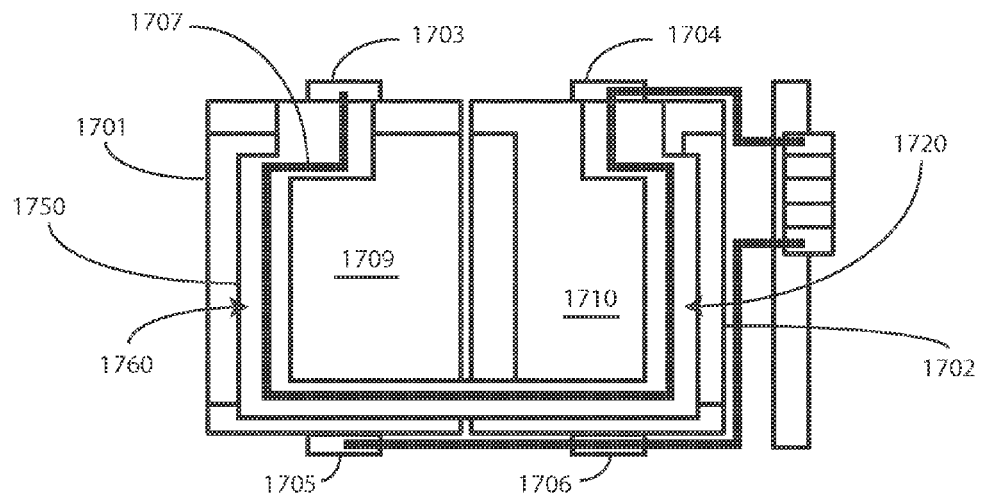
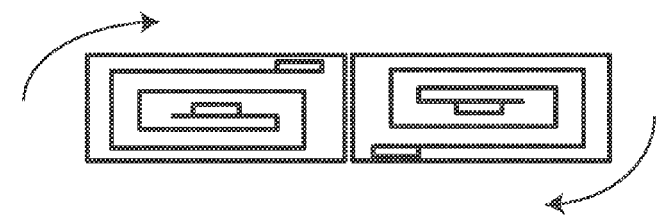
*FIG. 17*
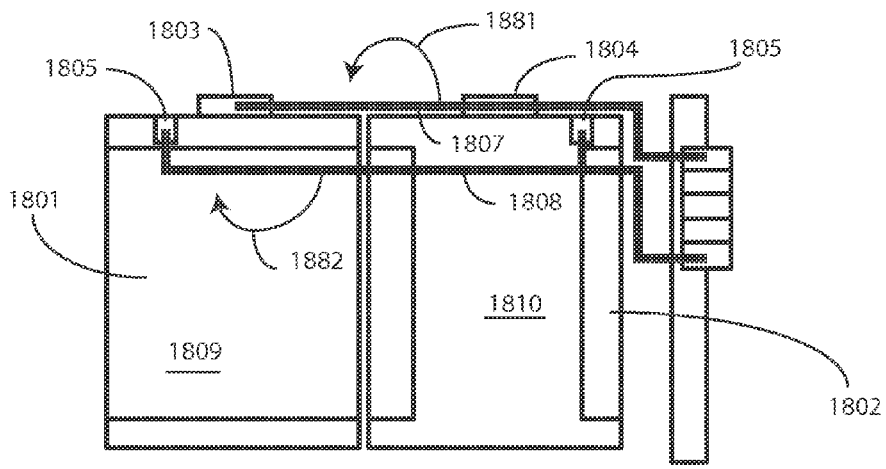
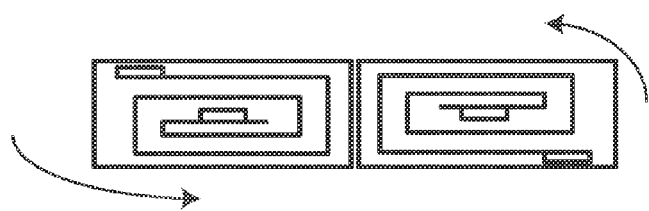
*FIG. 18*

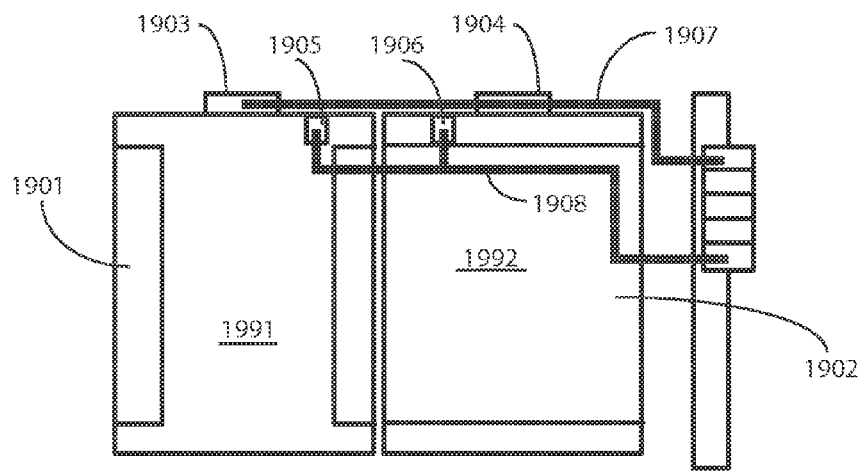
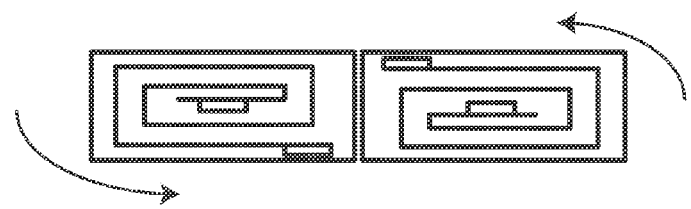
FIG. 19
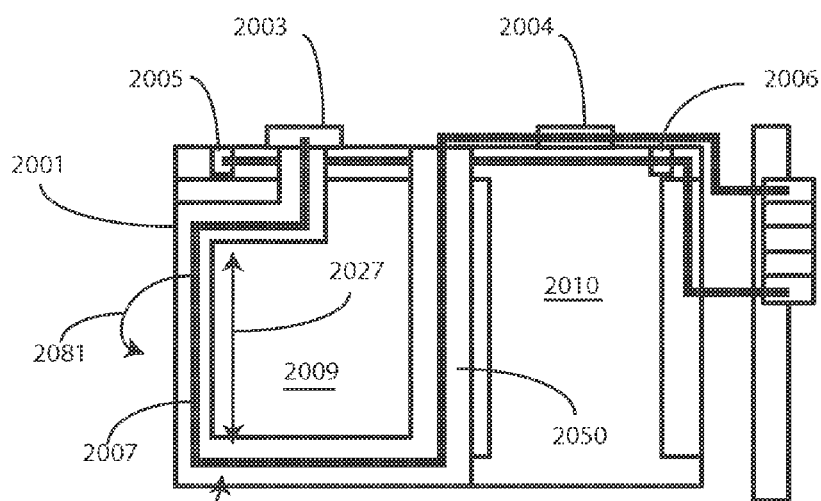
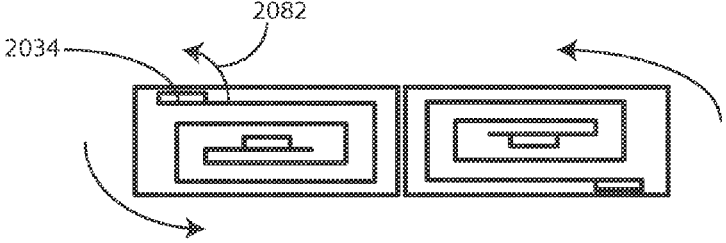
FIG. 20

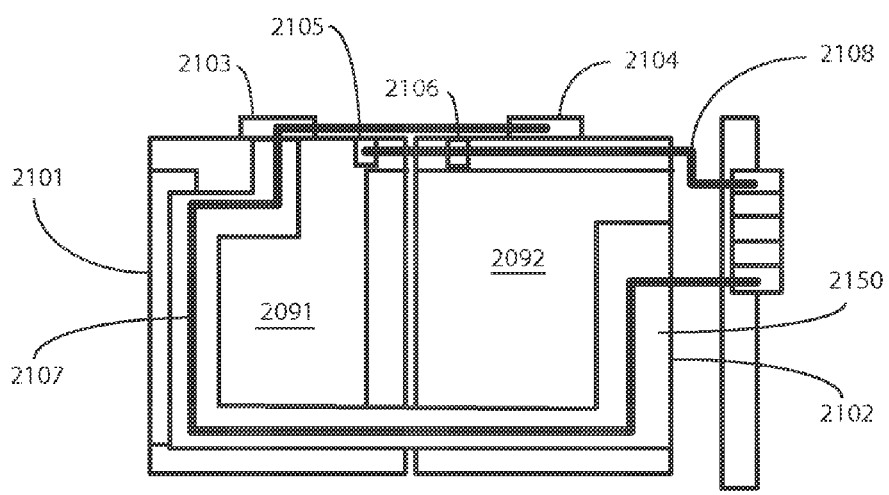
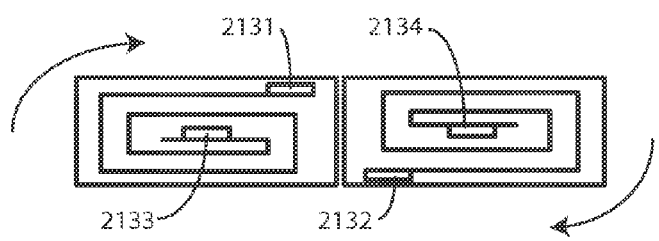
FIG. 21
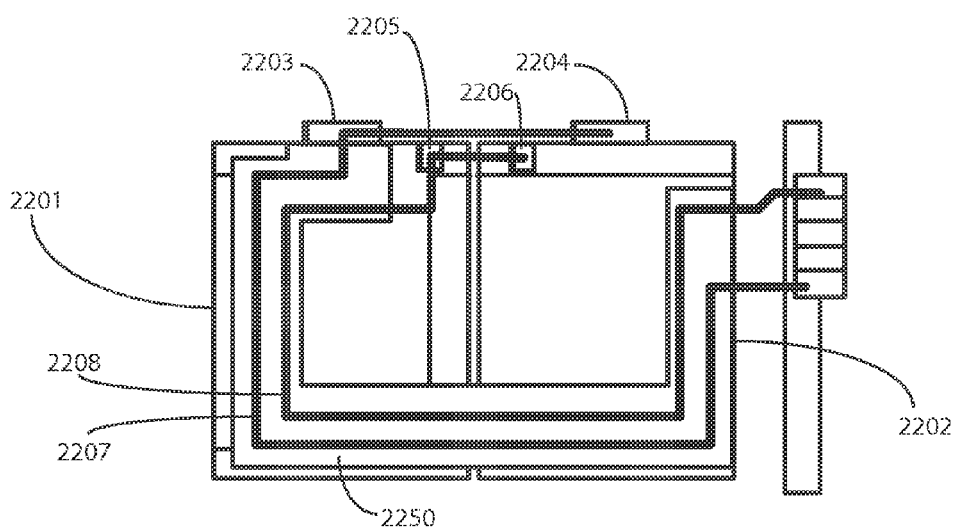
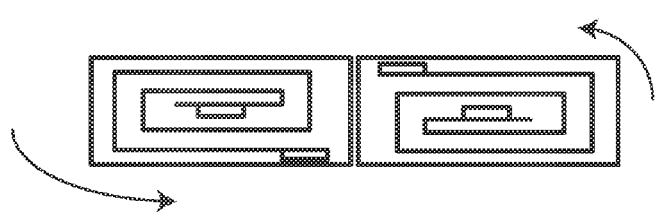
FIG. 22

ELECTROCHEMICAL BATTERY PACK WITH REDUCED MAGNETIC FIELD EMISSION AND CORRESPONDING DEVICES

CROSS REFERENCE TO PRIOR APPLICATIONS

This application is related to commonly assigned U.S. application Ser. No. 12/766,023, filed Apr. 23, 2010, which is incorporated by reference for all purposes.

BACKGROUND

1. Technical Field

This invention relates generally to batteries having electrochemical cells, and more particularly to a battery pack having construction features that deliver reduced magnetic field emissions during discharge.

2. Background Art

The world is rapidly becoming portable. As mobile telephones, personal digital assistants, portable computers, tablet computers, and the like become more popular, consumers are continually turning to portable and wireless devices for communication, entertainment, business, and information. Each of these devices owes its portability to a battery. The electrochemical cells operating within a battery allow these devices to slip the surly bounds of having to be tethered to a wall outlet, thereby providing the user with freedom and mobility.

The primary job for the electrochemical cells working within the battery pack is to deliver energy. Rechargeable batteries are configured to selectively store energy as well. Magnetic field emissions associated with a battery pack are generally not a design consideration. By way of example, when a battery pack is used to power a typical electronic device, the magnetic field emissions therefrom may not be significant enough to affect the operation of that device. However, in some applications, the magnetic field emission can be a design issue.

There is thus a need for a battery pack having reduced magnetic emission.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 9 illustrates a view of a first orientation of a plurality of cells with minor faces abutting, each cell having an asymmetrical internal electrode construction that is suitable for use in a battery pack configured in accordance with embodiments of the invention.

FIG. 10 illustrates a view of another orientation of a plurality of cells with minor faces abutting, each cell having an asymmetrical internal electrode construction that is suitable for use in a battery pack configured in accordance with embodiments of the invention.

FIGS. 13-28 illustrate various cell construction examples suitable for use in batteries configured in accordance with embodiments of the invention.

Figure 1:
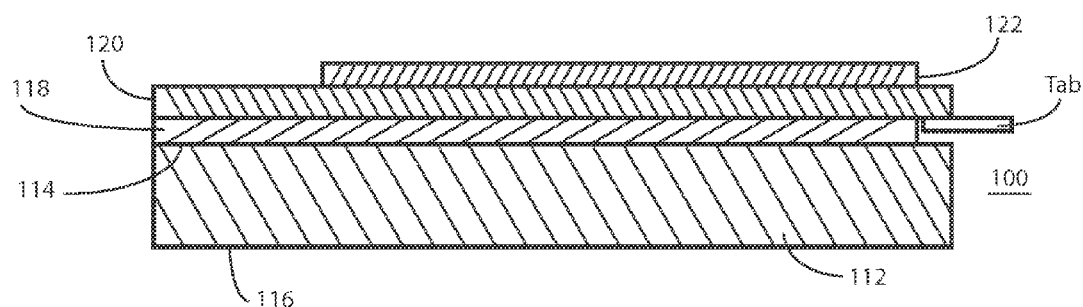
FIG. 1 illustrates a cross-sectional side view of a electrode layer assembly used in a cell configured in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Electrochemical cells, such as those used in lithium-ion cells, are generally constructed with stacked electrode layers and their associated metal tabs that are wound together in a "jellyroll configuration." These layers, which can include an anode, an electrical insulator or "separator," and a cathode, are wound together and then enclosed in a metal housing. While the housing can be manufactured from any of a number of materials, it is often manufactured from steel, aluminum or aluminum alloy. The housing is then filled with an organic electrolyte. This type of construction can create loops or other current paths that generate different levels of magnetic field emissions, depending on its detailed design, when the battery pack is discharging. These fields can be unsuitably large in some applications. These magnetic fields can be especially troublesome when the discharge current is characterized by audio-frequency pulses, as in some mobile phone applications. Embodiments of the present invention provide battery pack constructions using pluralities of cells where the constructions are configured to deliver reduced magnetic field emissions.

For example, in one embodiment a plurality of cells is coupled together within the battery pack with electrical conductors. The electrical conductors may be configured as metal strips, substrate traces, or other current conductors. Each cell within the battery pack includes therein an asymmetrical internal electrode and tabs connection construction. The asymmetrical internal electrode construction arises due to the wound electrodes within the cell. These wound electrodes are asymmetrical when viewed in cross section. In accordance with embodiments of the invention, these cells having asymmetrical internal configurations can be physically arranged and oriented within a battery pack to mitigate magnetic field emissions during discharge operations. Where the cells are rechargeable cells, embodiments of the invention work to reduce magnetic field emissions during charging operations as well.

In one embodiment, adjacent cells are arranged such that their corresponding asymmetrical internal electrode constructions are oriented in different or opposite directions with respect to each other. For example, where two cells have housings with minor faces abutting, one cell can be configured differently from its adjacent cell such that one cell's internal electrode structure is oriented differently. When viewed in cross section, the different orientation causes the internal electrode structure of one cell to appear as a rotation, mirror image, or other transformation of that of an adjacent cell. This results in the internal tabs being physically oriented "out of phase" with each other, thereby reducing overall magnetic field emissions. In addition to cell orientation, electrical conductors within the battery pack that connect the cells to the external terminals can be routed so as to mitigate magnetic field emissions from other electrical conductors, tabs within the cells, or combinations thereof.

Illustrating by example, in one embodiment an electrochemical cell, such as a lithium-ion or lithium-polymer rechargeable cell, is arranged within a battery pack with its internal electrode structure oriented differently from that of its neighbors. When the cells are arranged side-by-side, the negative terminals can be positioned opposite one another by rotating each adjacent cell by 180 degrees. Electrical conductors connecting these negative terminals can then pass between or over major faces of the housings of each cell. Where the housings are coupled to an electrode carrying a positive charge, this arrangement leads to a reduction in the magnetic "noise" generated by the battery pack.

In another embodiment where cells are stacked, the negative terminals can additionally be positioned such that those of adjacent cells are 180 degrees out of phase. Electrical conductors connecting these negative terminals can then pass between or over the housings of the cells that carry positive charge, thereby mitigating emitted magnetic fields during discharge. Further, in either the side-by-side or stacked configurations, the cells may be "flipped" such that the electrical tabs within each cell are oriented differently, thereby further reducing the magnetic field emissions. Numerous examples of different configurations will be provided in the discussion of FIGS. 12-24.

Referring now to FIG. 1, illustrated therein is a cross-sectional side view of a typical electrode layer assembly found in an electrochemical cell configured in accordance with embodiments of the invention. As noted above, electrochemical cells are generally made from a positive electrode (cathode), a negative electrode (anode), and a separator that prevents these two electrodes from touching. While the separator electrically separates the cathode and anode, the separator permits ions to pass through.

The electrode 100 of FIG. 1 includes a separator 112 having a top and bottom 114 and 116. Disposed on the top 114 of the separator 112 is a first layer 118 of an electrochemically active material. For example, in a nickel metal hydride cell, the first layer 118 may be a layer of a metal hydride charge storage material. Alternatively, the first layer 118 may be lithium or a lithium intercalation material as is commonly employed in lithium cells. While rechargeable batteries will be used as exemplary cells for ease of discussion, it will be obvious to those of ordinary skill in the art having the benefit of this disclosure that the constructs described herein can also be applied to non-rechargeable or "primary use" cells as well.

Disposed atop first layer 118, is a current collecting layer 120. The current collecting layer may be fabricated of any of a number of metals or alloys known in the art. Examples of such metals or alloys include, for example, nickel, aluminum, copper, steel, nickel plated steel, magnesium doped aluminum, and so forth. Disposed atop the current collection layer 120 is a second layer 122 of electrochemically active material.

The electrochemical cell stores and delivers energy by transferring ions between electrodes through a separator. For example, during discharge, an electrochemical reaction occurs between electrodes. This electrochemical reaction results in ion transfer through the separator, and causes electrons to collect at the negative terminal of the cell. When connected to a load, such as an electronic device, the electrons flow from the negative pole through the circuitry in the load to the positive terminal of the cell. This is shown in circuit diagrams as current flowing from the cathode to the anode.

When the electrochemical cell is charged, the opposite process occurs. Thus, to power electronic devices, these electrons must be delivered from the cell to the electronic device. This is generally accomplished by coupling conductors, such as conductive foil strips, sometimes referred to colloquially as "electrical tabs" to the various layers. Such tabs are shown in FIG. 2.

Figure 2:
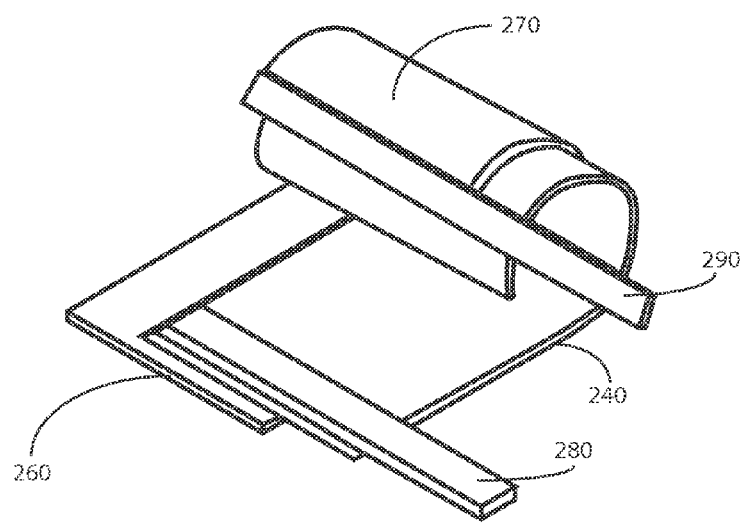
FIG. 2 illustrates a stack of electrodes assembled in the jellyroll configuration so as to make a rechargeable cell.

Referring now to FIG. 2, illustrated therein is stack of electrodes like that in FIG. 1 assembled in the jellyroll configuration so as to make a rechargeable cell. In FIG. 2, two electrodes 240 and 260 are provided as described above. Electrode 240 is fabricated with a layer of active electrode material. For example, electrode 240 is fabricated with electrochemically active negative electrode material while electrode 260 is fabricated with a layer of electrochemically active positive electrode material.

A first tab 280 is coupled to one electrode 240, while a second tab 290 is coupled to another electrode 260. These tabs 280,290 can be coupled to the current collectors of each electrode 240,260.

The electrodes 240 and 260 are arranged in stacked relationship, with the tabs 280,290 being disposed on opposite edges of the stack. Thereafter, the stack is rolled into a roll 270, sometimes referred to as a "jellyroll," for a subsequent insertion into an electrochemical cell housing. The housings are generally oval, but can also be rectangular, or circular in cross section as well. The housings have an opening that is sealed when the roll 270 is inserted.

Figure 3:
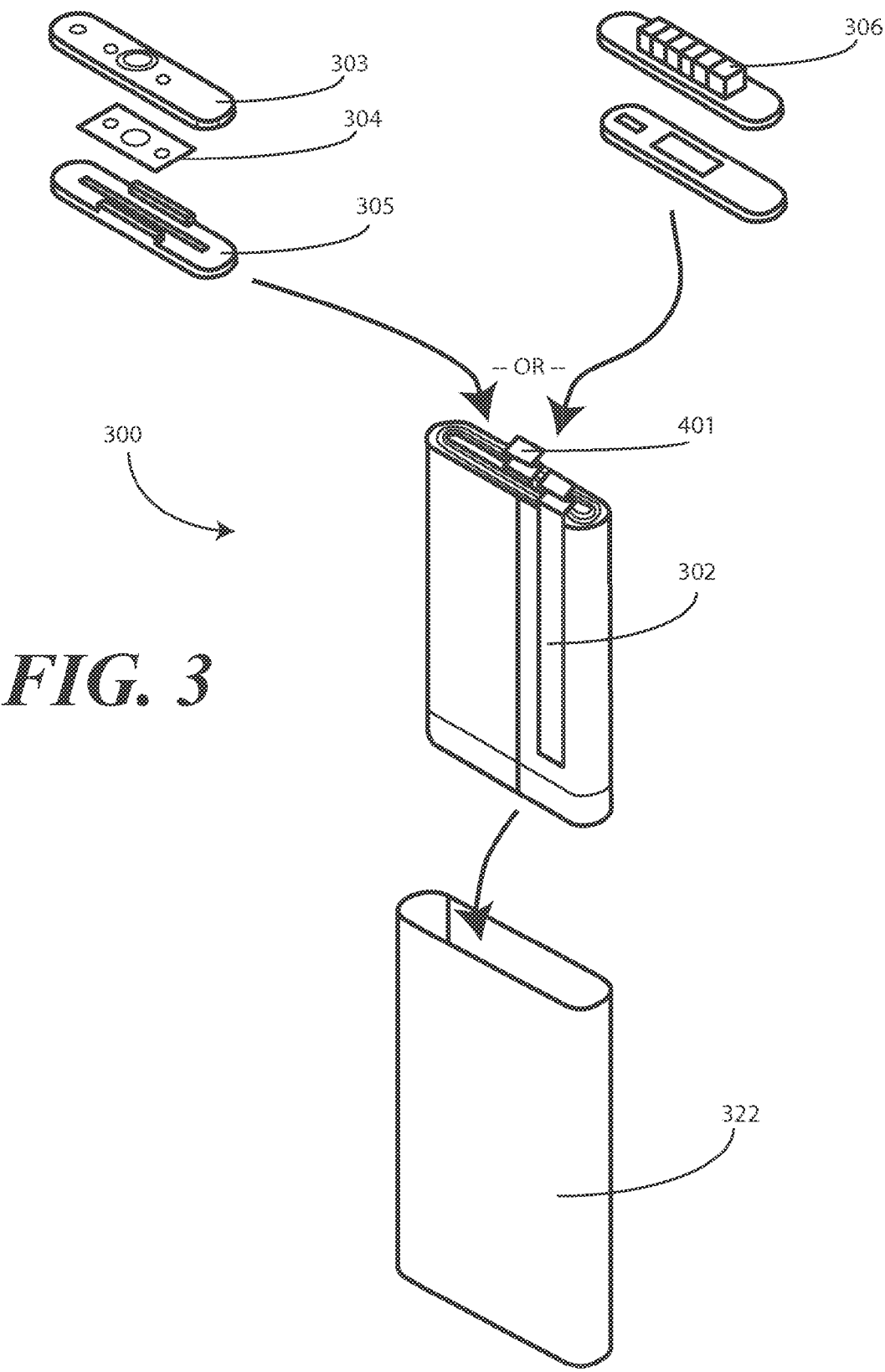
FIG. 3 illustrates one embodiment of a cell construction suitable for use in a battery pack configured in accordance with embodiment of the invention.

This rolling process creates an asymmetrical internal electrode construction. As shown in FIG. 2, when the electrodes 240,260 are rolled, tab 290 will end up substantially in the center of the roll 270, while tab 280 will end up generally on the periphery of the roll 270. When the roll 270 is placed in a housing, as shown in FIG. 3, that tab 290 will be centrally disposed within the housing. Tab 280 will be disposed peripherally within the housing. The result is a non-symmetrical configuration when viewed in cross section.

Turning now to FIG. 3, illustrated therein is a cell 300 having an asymmetrical internal electrode construction. The construction is asymmetrical because tab 302 is disposed on one side at the periphery of the housing 322, while tab 301 is centrally disposed. Accordingly, when viewed from the front of the page, tab 302 appears on the right of tab 301. When viewed from the rear, tab 302 is left of tab 301. Hence, there is a non-symmetrical configuration within the housing 322.

In the illustrative embodiment of FIG. 3, the housing 322 can be sealed in a variety of ways, two examples of which are shown. In one illustrative embodiment, the housing 322 can be sealed by a lid 303. The lid 303, which can be manufactured from metal, is connected to tab 301 through lid 303 and serves as one electrical terminal of the cell. An insulator 305 can be provided to isolate the lid 303 from the second tab 302. The second tab 302 can be coupled to the housing 322, which serves as the other terminal of the cell. Where the housing 322 is manufactured from aluminum, the housing 322 will be connected to the cathode. Conversely, where the housing 322 is manufactured from steel, the housing 322 will be connected to the anode. Constructions similar to that of FIG. 3 are known in the art as recited in U.S. Pat. No. 6,317,335 to Zayatz.

In alternate embodiments, the tabs 301,302 can be connected to a terminal block 306 rather than to the lid 303 and housing 322. The terminal block 306 provides a convenient way for both the positive terminal and negative terminal to reside on a common end of the cell 300. Note that the terminal block 306 of FIG. 3 is shown to provide a conceptual illustration only. Actual terminal blocks of cells will vary from manufacturer to manufacturer in size and physical geometry.

Regardless of whether the cell 300 employs a lid-based construction or a terminal block-type construction, either embodiment can emit a relatively large amount of magnetic field noise when in operation. This noise is measured in dB A/m, and increases with increasing current. Further, when the current is pulsed, as is the case when a cell is servicing a GSM device such as a mobile telephone, the noise can be exacerbated. Embodiments of the present invention work to mitigate this magnetic field emission with strategic placement and orientation of cells and electrical conductor wiring within the battery pack.

Figure 4:
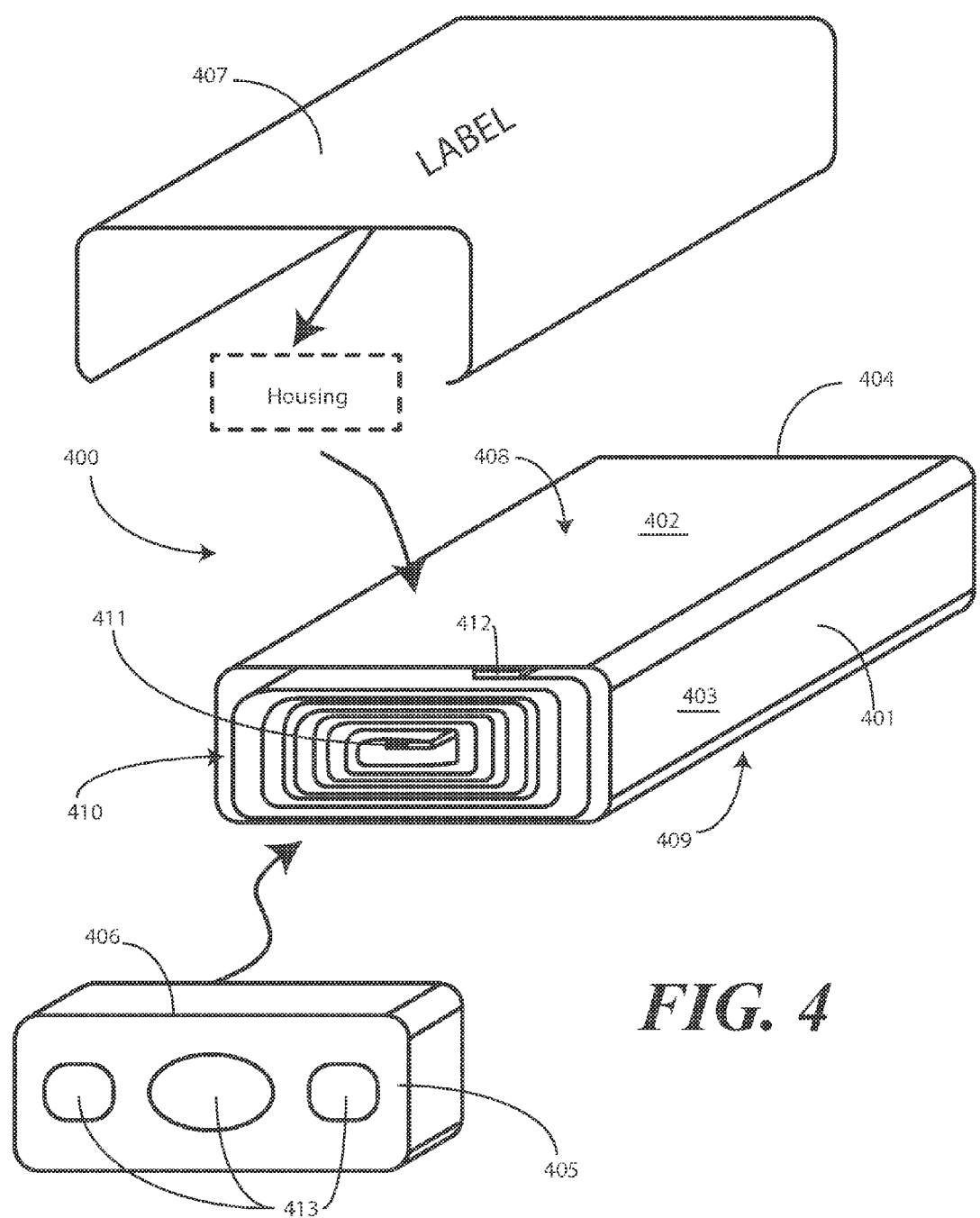
FIG. 4 illustrates a perspective view of a cell suitable for use in batteries configured in accordance with embodiments of the invention.

Turning to FIG. 4, an illustrative cell 400 having an asymmetrical internal electrode construction 410 is shown. The cell 400, like that shown in FIG. 3, is disposed within a housing 401. The housing 401 includes both major faces 402 and minor faces 403. The housing 401 also includes a bottom 404 and a top 405. In this illustrative embodiment, the sealed end of the housing 401 defines the bottom 404, while the lid 406 defines the top 405.

The electrical tabs 411,412 are arranged in a non-symmetrical configuration within the housing 401 such that a first electrical tab 411 is centrally disposed within the housing 401 and a second electrical tab 412 is peripherally disposed within the housing 401. The electrical tabs 411,412 couple terminals 413 disposed outside the cell 400 to the anode and the cathode of the electrode construction.

A label 407 is placed on the housing 401 when the cell construction is complete. As most manufacturers build cells with uniform, controlled processes, it is frequently the case that an orientation of the asymmetrical internal electrode construction 410 can be determined by identifying upon which side the label 407 is disposed. For example, in FIG. 4 the top 408 can be referred to as the "label side," while the bottom 409 can be referred to as the "non-label side."

For simplicity of discussion, the various embodiments shown in remaining figures will refer to the label side of a cell and a non-label side of the cell. This reference presumes a common orientation of the asymmetrical internal electrode constructs therein relative to a placement of the label, such that reference to "the label side" refers to one orientation of the asymmetrical internal electrode construction and reference to "the non-label side" refers do a different orientation of the asymmetrical internal electrode construction. It should be clear that these references are intended only to identify the electrode orientations and to help facilitate a description of embodiments of the invention. Operation and benefits of embodiments of the invention are in no way dependent upon the location of the label. Further, other ways of identifying the orientation of the asymmetrical internal electrode construction will be readily available to those of ordinary skill in the art having the benefit of this disclosure.

Figure 5:
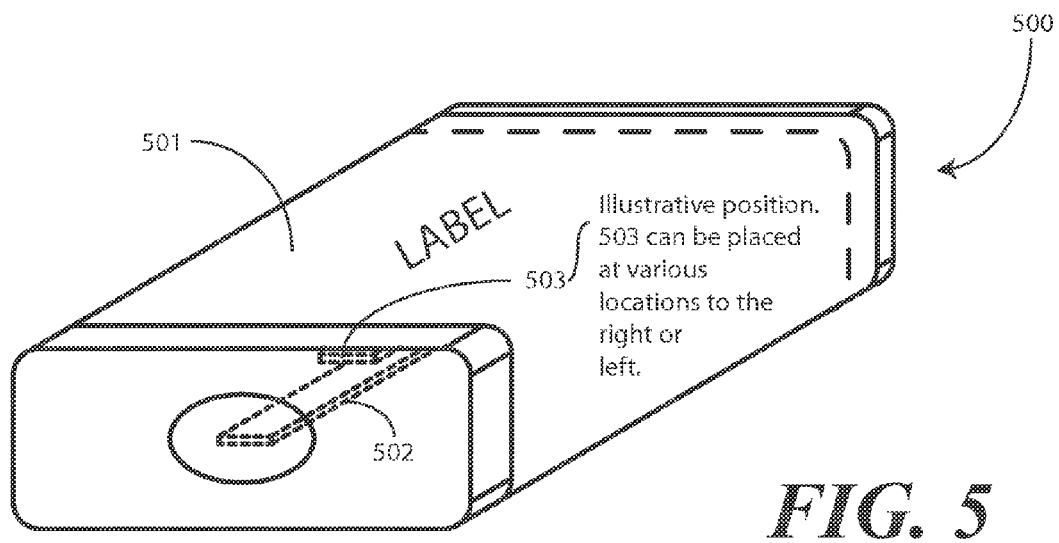
FIG. 5 illustrates a view of a first orientation of a cell having an asymmetrical internal electrode construction that is suitable for use in a battery pack configured in accordance with embodiments of the invention.
Figure 6:
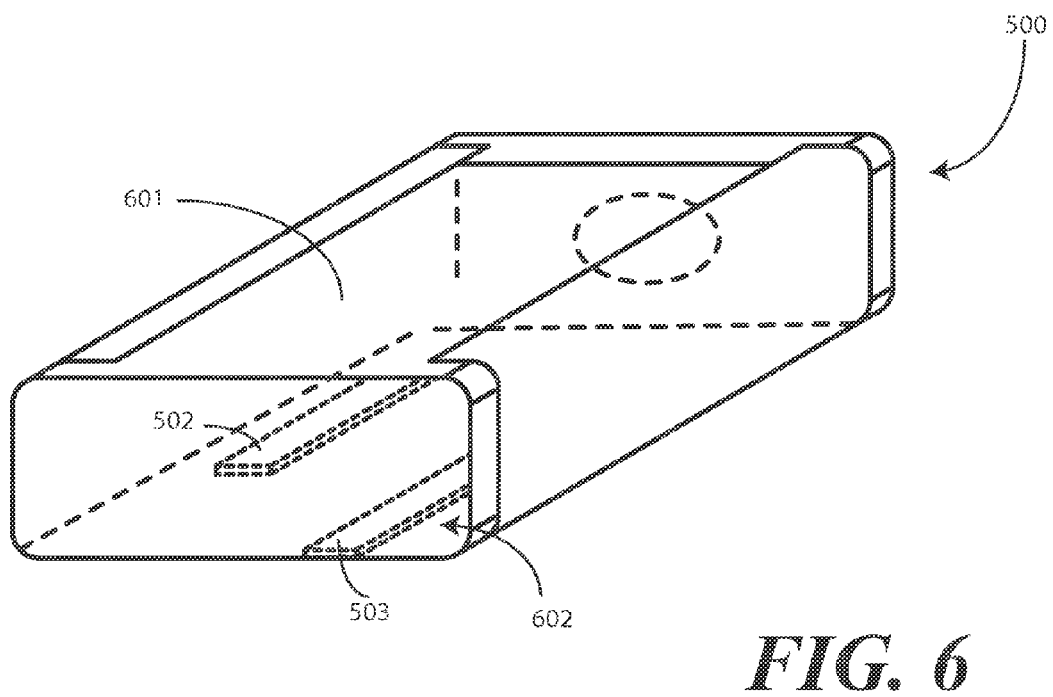
FIG. 6 illustrates a view of another orientation of a cell having an asymmetrical internal electrode construction that is suitable for use in a battery pack configured in accordance with embodiments of the invention.

This is illustrated in FIGS. 5 and 6. In FIG. 5, the label side 501 of a cell 500 is facing upward. The internal electrode construction has a centrally disposed tab 502, and a peripherally disposed tab 503. When the cell 500 is oriented with the label side 501 facing up, the peripherally disposed tab 503 is located above and to the right of the centrally disposed tab 502.

In FIG. 6, the non-label side 601 of the cell 500 is facing upward. Additionally, the cell has been rotated 180 degrees in a plane that is parallel to the non-label side 601 such that the bottom 602 of the cell 500 is visible. As a result of "flipping" and "turning" the cell 500, the peripherally disposed tab 503 is now to the right and below the centrally disposed tab 502. Had the cell 500 only been flipped without the 180-degree rotation, the peripherally disposed tab 503 would have ended up below and to the left of the centrally disposed tab 502. FIGS. 5 and 6 illustrate how the label placement can provide an indication of electrode construction orientation.

Figure 7:
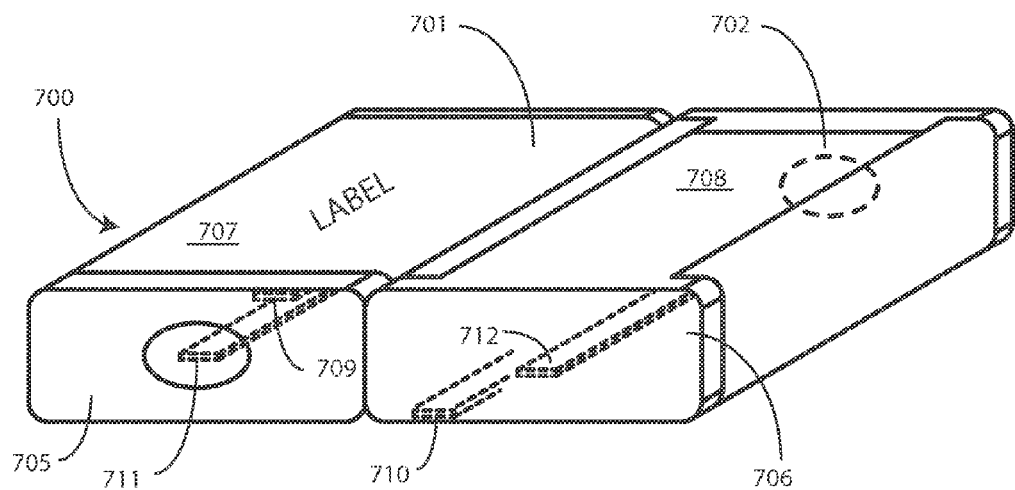
FIG. 7 illustrates a view of a first orientation of a pair of cells with minor faces abutting, each cell having an asymmetrical internal electrode construction that is suitable for use in a battery pack configured in accordance with embodiments of the invention.

Turning now to FIG. 7, illustrated therein are two cells 701,702 disposed in an adjacent relationship with minor faces 703,704 abutting. The two adjacent cells 701,702 are arranged with their corresponding asymmetrical internal electrode constructions 705,706 oriented in different directions. Cell 701 has its label side 707 facing upward such that its peripherally disposed electrode 709 is above and to the right of its centrally disposed electrode 711. Cell 702 has been rotated and flipped such that its non-label side 708 is facing upward. Cell 702 has also been rotated 180 degrees relative to cell 701. Accordingly, the peripherally disposed tab 710 is now disposed to the right and below the centrally disposed tab 712. (Note that tabs 710,712 are shown as not extending to the bottom of the housing of cell 702 due to the fact that some manufacturers employ cells that do not reach the bottom of the electrode assembly.)

The embodiment of FIG. 7 is one "building block" that can be used in batteries configured in accordance with embodiments of the present invention. For example, the two-cell structure of FIG. 7 could be repeated in a side-by-side configuration to create a four, six, eight, or more cell battery pack. Similarly, the two-cell structure of FIG. 7 could be repeated in a stacked configuration to create a multi-cell battery pack. Of course, combinations could be used, such as by having four cells side-by-side with another four stacked thereon.

Figure 8:
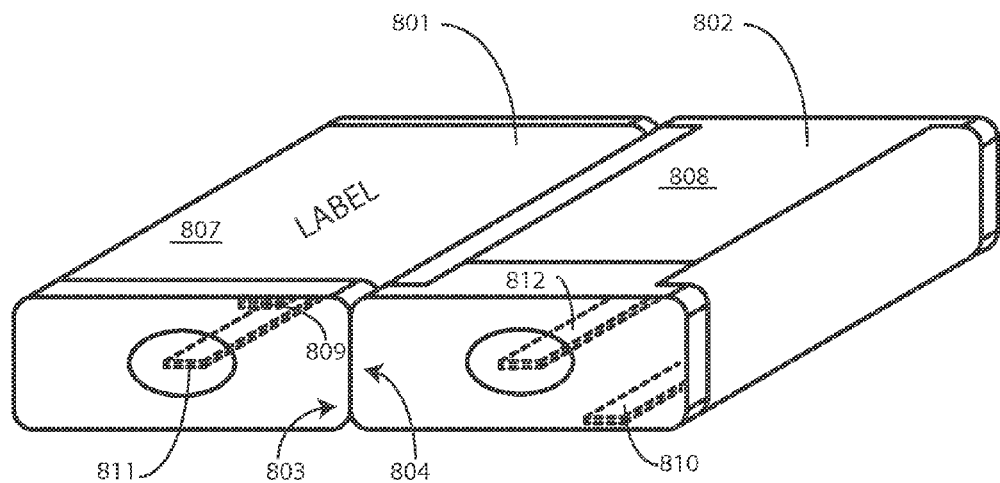
FIG. 8 illustrates a view of another orientation of a pair of cells with minor faces abutting, each cell having an asymmetrical internal electrode construction that is suitable for use in a battery pack configured in accordance with embodiments of the invention.

Turning now to FIG. 8, illustrated therein is a different two-cell configuration, yet one in which the asymmetrical internal electrode constructions are still oriented in different directions. FIG. 8 is similar to FIG. 7 in that the cells 801,802 are arranged in a layer with their minor faces 803,804 abutting. The embodiment of FIG. 8 differs from that of FIG. 7 in that cell 802 has been flipped but not rotated relative to cell 801.

As shown in FIG. 8, cell 801 has its label side 807 facing upward such that its peripherally disposed electrode 809 is above and to the right of its centrally disposed electrode 811. Cell 802 has been rotated and flipped such that its non-label side 808 is facing upward. Accordingly, the peripherally disposed tab 810 is now disposed to the left and below the centrally disposed tab 812. As with the embodiment of FIG. 7, the embodiment of FIG. 8 can serve as a building block in batteries configured in accordance with embodiments of the present invention. The embodiment of FIG. 8 can be used in side-by-side configurations, stacked configurations, or combinations thereof. For example, a battery pack can be manufactured from a plurality of layers, with each layer arranged such that a first major face of a first layer cell is adjacent to a second major face of a second layer cell, and so forth.

Turning now to FIG. 9, illustrated therein is one exemplary three-side cell configuration 900 suitable for use with embodiments of the invention. As shown in FIG. 9, three cells 901,902,903 form a layer by being disposed adjacently with their minor faces abutting. Cells 901 and 903 have their label sides 905,907 facing upward. The center cell, cell 902, has its non-label side 906 facing upward. Further, center cell 902 has been rotated 180 degrees relative to cells 901,903. Accordingly, where the labels correspond to the asymmetrical internal electrode construction orientations, the electrode assembly of cell 902 will be oriented differently than those of cell 901 and cell 903, as shown in FIG. 9. As with FIGS. 7 and 8, the embodiment of FIG. 9 could be repeated in layers or stacks, or could be combined with the embodiments of FIGS. 7 and 8 to form a multi-cell battery pack.

Turning now to FIG. 10, illustrated therein is an alternate three-side cell configuration 1000 suitable for use with embodiments of the invention. As shown in FIG. 10, three cells 1001,1002,1003 form a layer by being disposed adjacently with their minor faces abutting. Cells 1001 and 1003 have their label sides 1005,1007 facing upward. The center cell, cell 1002, has its non-label side 1006 facing upward. Accordingly, where the labels correspond to the asymmetrical internal electrode construction orientations, the electrode assembly of cell 1002 will be oriented such that its asymmetrical internal electrode construction is oriented opposite that of cell 1001 and cell 1003.

As with FIGS. 7-9, the embodiment of FIG. 10 could be repeated in layers or stacks, or could be combined with the embodiments of FIGS. 7-9 to form a multi-cell battery pack. By orienting the internal electrode constructions of adjacent cells differently, the currents flowing through the tabs and electrode assemblies of adjacent cells flow in different directions. This alternating of the direction of current flow is used by embodiments of the present invention to reduce magnetic field emissions. Where multiple layers are used, the layers can also be arranged to reduce magnetic field emissions. For example, a first layer cell and a second layer cell can be arranged such that the asymmetrical internal electrode construction of the first layer cell is oriented opposite the asymmetrical internal electrode construction of the second layer cell, and so forth.

Figure 11:
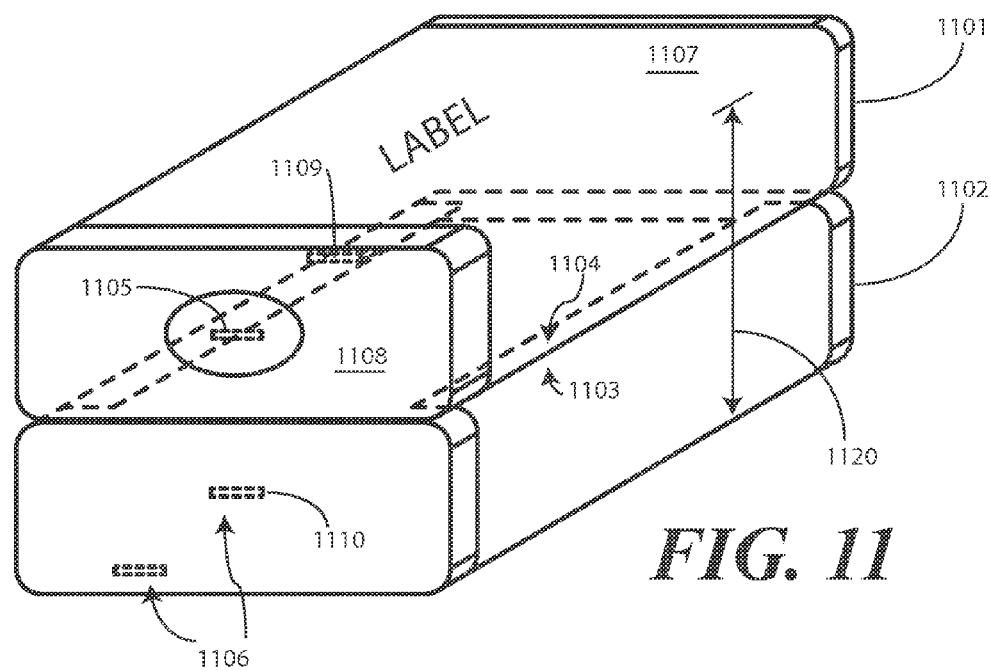
FIG. 11 illustrates a view of a first orientation of a pair of cells with major faces abutting, each cell having an asymmetrical internal electrode construction that is suitable for use in a battery pack configured in accordance with embodiments of the invention.

Turning now to FIG. 11, illustrated therein is an alternate cell configuration in which two adjacent cells 1101,1102 are arranged in a stack such that major faces 1103,1104 of the adjacent cells 1101,1102 are abutting. As with previous embodiments, the cells 1101,1102 are arranged with their corresponding asymmetrical internal electrode constructions 1105,1106 oriented in different directions. Cell 1101 has its label side 1107 facing upward, while cell 1102 has its non-label side 1108 facing upward. Additionally, cell 1102 has been rotated 180 degrees out of phase with respect to cell 1101. In the embodiment of FIG. 11, a peripherally disposed tab 1109 of a first cell 1101 and a peripherally disposed tab 1110 of a second cell 1102 are disposed on a common side 1120 of the stack.

Figure 12:
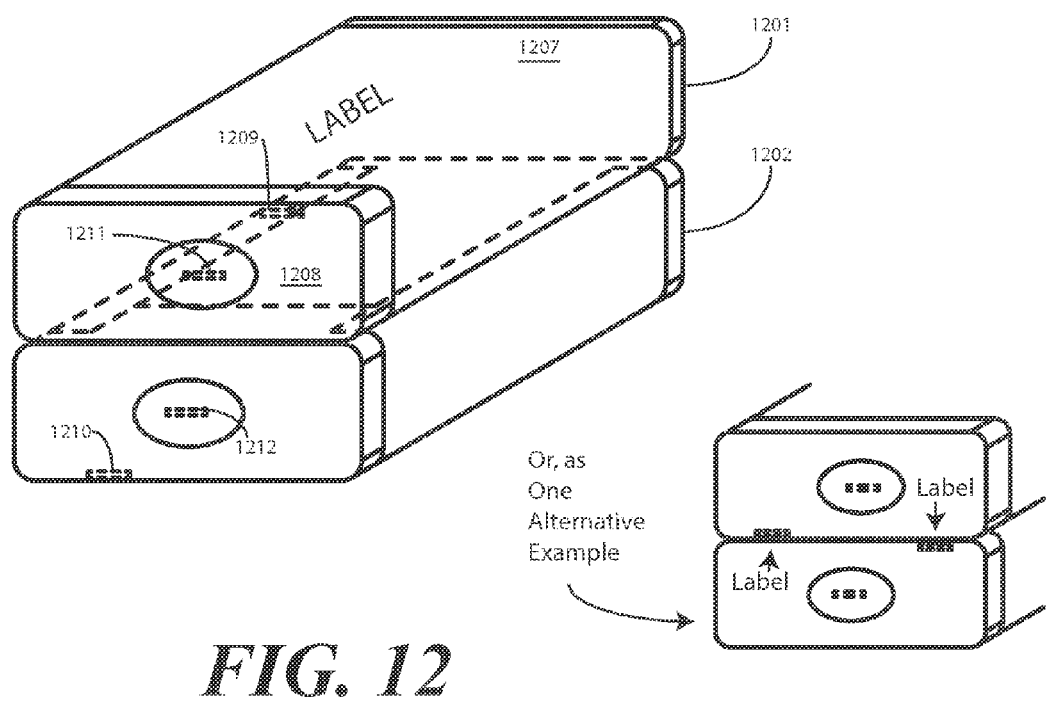
FIG. 12 illustrates another view of a first orientation of a pair of cells with major faces abutting, each cell having an asymmetrical internal electrode construction that is suitable for use in a battery pack configured in accordance with embodiments of the invention.

Turning now to FIG. 12, illustrated therein is another cell configuration in which two adjacent cells 1201,1202 are arranged in a stack with major faces of the adjacent cells abutting. As with previous embodiments, the cells 1201,1202 are arranged with their corresponding asymmetrical internal electrode constructions oriented in different directions. Cell 1201 has its label side 1207 facing upward, while cell 1202 has its non-label side 1208 facing upward. When viewed in cross section, the cells 1201,1202 are arranged such that the first centrally disposed tab 1211 and the second centrally disposed tab 1212 are disposed between a first peripherally disposed 1209 tab of the first cell 1201 and a second peripherally disposed tab 1210 of the second cell 1202 in the stack.

The embodiments of FIGS. 5-12 are a few of the combinations and permutations of cell arrangements that can be used in accordance with embodiments of the invention. Others will be readily known to those of ordinary skill in the art having the benefit of this disclosure.

Turning now to FIGS. 13-25, illustrated therein are examples of various configurations of cells and electrical conductor routings used to connect the terminals of the cells to a battery pack terminal block, each being configured to reduce magnetic field emissions in accordance with embodiments of the invention. While prior art cell assemblies are manufactured with cells each arranged in the same direction, embodiments of the present invention arrange adjacent cells in different orientations such that the currents flowing through the tabs, conductors, and electrodes of the battery pack components tend to cancel each other, thereby reducing the overall magnetic field emission.

Further, it should be noted that the lengths of the electrical conductors are non-intuitive in that they are generally longer than necessary and use more material than necessary. However, the paths traveled by the electrical conductors are strategic and are specifically designed to mitigate magnetic fields. For example, by causing an electrical conductor to pass across a major face of a cell, and more specifically across a major face atop an internal tab, the electrical conductor can be used to cancel or reduce the magnetic field emitted by the tab when the current in the tab and conductor flow in opposite directions. The embodiments of FIGS. 13-25 have been experimentally shown to reduce magnetic emissions over assemblies using similarly oriented cells and traditional short, direct electrical conductors.

Figure 13:
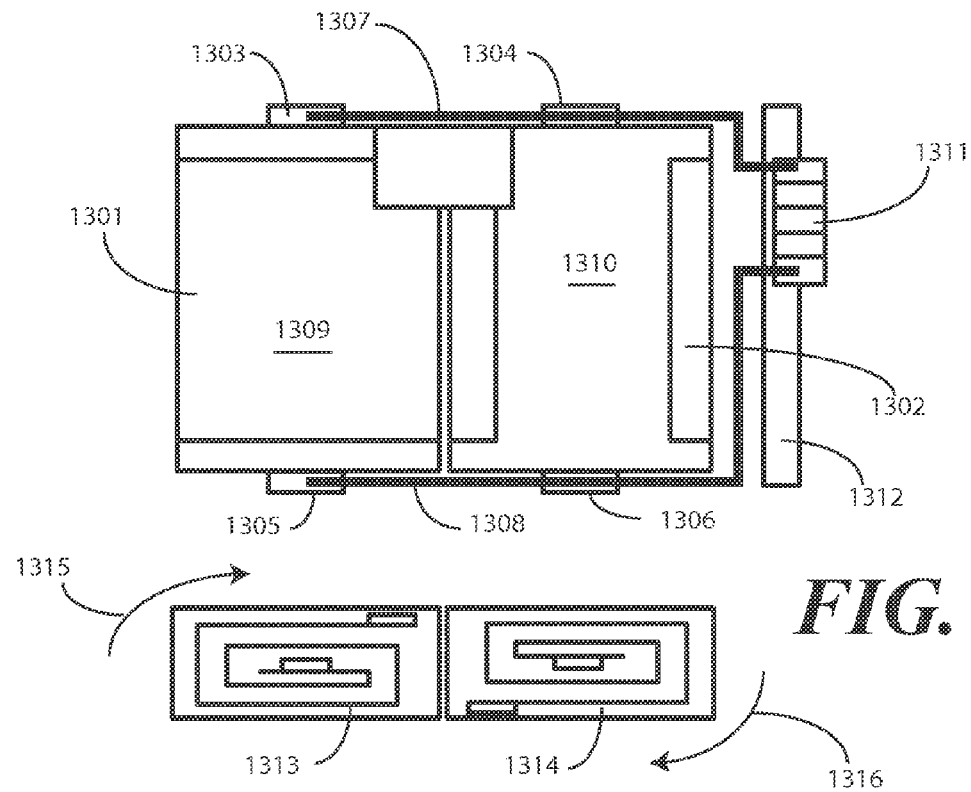

Beginning with FIG. 13, illustrated therein are two cells 1301,1302 disposed side-by-side in a layer with their minor faces abutting. Each cell 1301,1302 comprises a positive terminal 1305,1306 and a negative terminal 1303,1304. In FIG. 13, the positive terminals 1305,1306 are disposed on an opposite side of each cell housing relative to the negative terminals 1303,1304.

As shown in FIG. 13, the cells 1301,1302 are electrically connected in parallel, with a first electrical conductor 1307 coupled to each negative terminal 1303,1304 and a second electrical conductor 1308 coupled to each positive terminal 1305,1306. Electrical insulation 1320 can be included to ensure that cathode-coupled components do not short to anode-coupled components. The first electrical conductor 1307 and second electrical conductor 1308 couple the terminals of the cells 1301,1302 to a terminal block 1311 of the battery pack. The terminal block 1311 can be mounted on a substrate 1312, such as a printed circuit board or flexible substrate. The substrate 1312 can include electrical circuitry as well, such as safety circuits, fuel gauging circuits, charging circuits, identification circuits, and so forth.

The first electrical conductor 1307 and second electrical conductor 1308, which may be made from flexible metal for example, pass about the ends of the cells 1301,1302 en route to the terminal block 1311, thereby offering relatively short path lengths. In one embodiment, these path lengths are configured such that one or both of the first electrical conductor 1307 or the second electrical conductor 1308 are arranged to reduce magnetic field emissions from one or more of the other electrical conductor, the electrode assemblies, the tabs within the cells 1301,1302, or combinations thereof by directing opposite currents to flow in proximate relationships.

For example, in the illustrative embodiment of FIG. 13, the first cell 1301 is arranged with its label side 1309 facing upward. The second cell 1302 has its non-label side 1310 facing upward. Accordingly, the corresponding asymmetrical internal electrode constructions 1313,1314, which are shown in a cross-sectional view, are oriented in opposite directions. When the cells 1301,1302 are discharging, currents 1315, 1316 flowing through the corresponding asymmetrical internal electrode constructions 1313,1314 flow in opposite directions, thereby mitigating magnetic field emissions.

Figure 14:
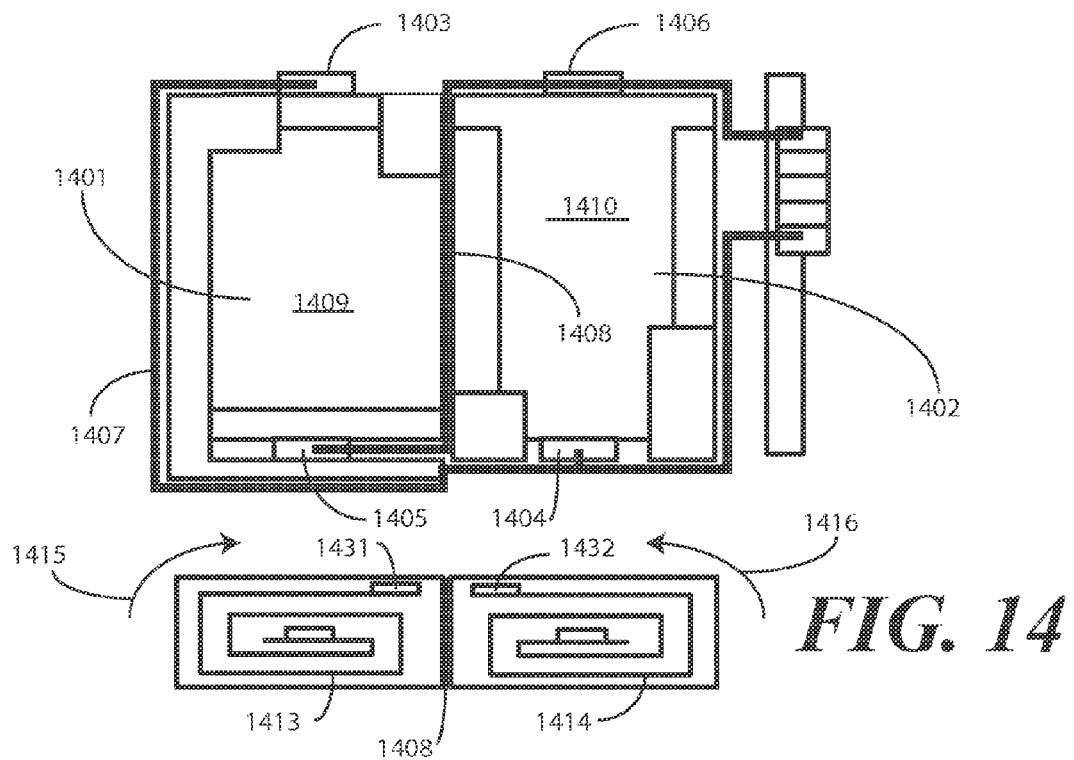

Turning now to FIG. 14, illustrated therein is another embodiment of a side-by-side cell structure configured to reduce magnetic field emissions in accordance with embodiments of the invention. FIG. 14 is similar to FIG. 13 in that two cells 1401,1402 are disposed side-by-side in a layer with their minor faces abutting. Each cell 1401,1402 comprises a positive terminal 1405,1406 and a negative terminal 1403, 1404. As with FIG. 13, the positive terminals 1405,1406 are disposed on an opposite side of each cell housing relative to the negative terminals 1403,1404. Further, the cells 1401, 1402 are electrically connected in parallel, with a first electrical conductor 1407 coupled to each negative terminal 1403, 1404 and a second electrical conductor 1408 coupled each positive terminal 1405,1406. Cell 1401 is arranged with its label side 1409 facing upward, while cell 1402 has its non-label side 1410 facing upward.

FIG. 14 differs from FIG. 13 in that cell 1402 is rotated 180 degrees out of phase with respect to cell 1401. Accordingly the positive terminal 1406 of cell 1402 is disposed on the opposite end of the layer from positive terminal 1405. To couple the cells in parallel, both the first electrical conductor 1407 and second electrical conductor 1408 must pass about the long, minor faces of each cell 1401,1402, respectively. The first electrical conductor 1407 passes about the outer edge of the layer, while the second electrical conductor 1408 passes between the cells 1401,1402. Such routing may appear counterintuitive, in that it requires more conductor material and results in less efficient conductor paths. However, when routed in this fashion, these electrical conductors 1407,1408 are arranged to reduce magnetic field emissions from one or more of the electrical tabs 1431,1432 disposed within the cells 1401,1402 during discharge of the of the battery pack.

As shown in the sectional view, the second electrical conductor is disposed between electrical tabs 1431,1432. Since the cells 1401,1402 are oriented out of phase with respect to each other, the discharge current flowing in the second conductor 1408 will be opposite the discharge current flowing in one of the two tabs 1431,1432. Thus, by configuring the second conductor 1408 to pass atop about this "opposite current" tab disposed within one of the two adjacent cells 1401,1402, the current flowing in the conductor 1408 will be opposite in direction from that flowing in the tab, thereby reducing the magnetic field emissions. Additionally, with the corresponding asymmetrical internal electrode constructions 1413,1414 oriented in opposite directions, discharge currents 1415,1416 flowing through the corresponding asymmetrical internal electrode constructions 1413,1414 flow in opposite directions, thereby further mitigating magnetic field emissions.

Figure 15:
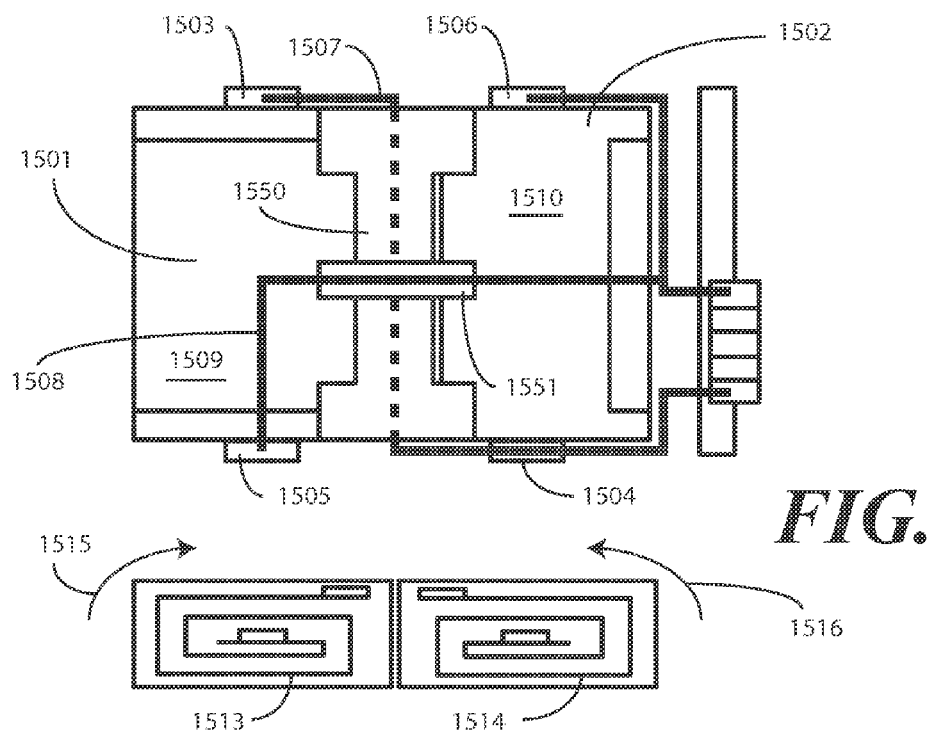

Turning now to FIG. 15, illustrated therein is another embodiment of a side-by-side cell structure configured to reduce magnetic field emissions in accordance with embodiments of the invention. Two cells 1501,1502 are disposed side-by-side in a layer with their minor faces abutting. The label side 1509 of cell 1501 is facing upward, while the non-label side 1510 of cell 1502 is facing upward. Each cell 1501,1502 comprises a positive terminal 1505,1506 and a negative terminal 1503,1504. The positive terminals 1505, 1506 are disposed on an opposite side of each cell housing relative to the negative terminals 1503,1504, and the cells 1501,1502 are electrically connected in parallel.

A first electrical conductor 1507 is coupled to each negative terminal 1503,1504. The first electrical conductor 1507 passes between the cells 1501,1502. A second electrical conductor 1508 couples the positive terminals 1505,1506, and is configured to pass across a major face of the cells 1501,1502. In this illustrative embodiment, electrical conductor 1508 is configured to pass across both the label side 1509 of the first cell 1501 and the non-label side 1510 of the second cell 1502. Insulating material 1550,1551 can be used to keep the electrical conductors 1507,1508 from shorting together or to the housing of each cell 1501,1502. This electrical conductor routing reduces magnetic field emissions from the layer.

Cell 1502 is rotated 180 degrees out of phase with respect to cell 1501. Accordingly the positive terminal 1506 of cell 1502 is disposed on the opposite end of the layer from positive terminal 1505. The corresponding asymmetrical internal electrode constructions 1513,1514 oriented in opposite directions, discharge currents 1515,1516 flowing through the corresponding asymmetrical internal electrode constructions 1513,1514 flow in opposite directions, thereby further working to reduce magnetic field emissions.

Figure 16:
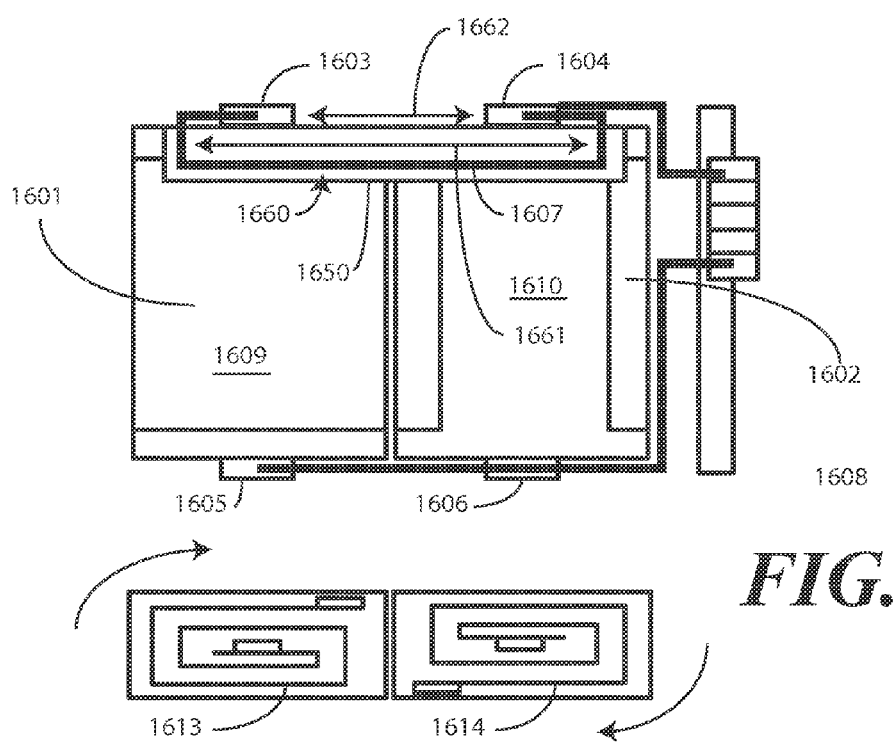

Turning now to FIG. 16, illustrated therein is another embodiment of a side-by-side cell structure configured to reduce magnetic field emissions in accordance with embodiments of the invention. Two cells 1601,1602 are disposed side-by-side in a layer with their minor faces abutting. The label side 1609 of cell 1601 is facing upward, while the non-label side 1610 of cell 1602 is facing upward. Each cell 1601,1602 comprises a positive terminal 1605,1606 and a negative terminal 1603,1604. The positive terminals 1605, 1606 are disposed on an opposite side of each cell housing relative to the negative terminals 1603,1604, and the cells 1601,1602 are electrically connected in parallel.

A first electrical conductor 1607 is coupled to each negative terminal 1603,1604. Rather than being coupled in a straight line between each negative terminal 1603,1604, the first electrical conductor 1607 is configured in a loop 1660 having a width 1660 greater than a distance 1662 between negative terminal 1603 and negative terminal 1604. This path, which is disposed atop an insulating layer 1650, works to reduce magnetic field emissions.

A second electrical conductor 1608 couples the positive terminals 1605,1606, and is configured to pass about a minor face of cell 1602. Cell 1602 oriented in-phase with respect to cell 1601, so the positive terminals 1605,1606 are disposed on a common side of the layer.

Turning now to FIG. 17, illustrated therein is another embodiment of a side-by-side cell structure configured to reduce magnetic field emissions in accordance with embodiments of the invention. Two cells 1701,1702 are disposed side-by-side in a layer with their minor faces abutting. The label side 1709 of cell 1701 is facing upward, while the non-label side 1710 of cell 1702 is facing upward. Each cell 1701,1702 comprises a positive terminal 1705,1706 and a negative terminal 1703,1704. The positive terminals 1705, 1706 are disposed on an opposite side of each cell housing relative to the negative terminals 1703,1704, and the cells 1701,1702 are electrically connected in parallel.

A first electrical conductor 1707 is coupled to each negative terminal 1703,1704. As with FIG. 16, the first electrical conductor 1707 is configured in a loop 1760 having a width greater than the distance between the negative terminals 1705,1706. The length 1770 of the loop 1760 is substantially greater than that of FIG. 16. This greater length 1770 allows the first electrical conductor 1707 to traverse a greater distance along the major faces of the cells 1701,1702. The loop 1760 is disposed atop an insulating layer 1750 and works to reduce magnetic field emissions. A second electrical conductor 1708 couples the positive terminals 1705,1706, and is configured as electrical conductor (1608) of FIG. 16.

Turning now to FIG. 18, illustrated therein is an alternate embodiment of a side-by-side cell structure configured to reduce magnetic field emissions in accordance with embodiments of the invention. As with previously described embodiments, two cells 1801,1802 are disposed side-by-side in a layer with their minor faces abutting. The label side 1809 of cell 1801 is facing upward, while the non-label side 1810 of cell 1802 is facing upward. Each cell 1801,1802 comprises a positive terminal 1805,1806 and a negative terminal 1803, 1804.

The embodiment of FIG. 18 differs from prior embodiments in that the positive terminals 1805,1806 and negative terminals 1803,1804 are disposed on a common side of each cell housing. Said differently, the positive terminals 1805, 1806 and negative terminals 1803,1804 are disposed on the same end of each cell 1801,1802. As with previous embodiments, the cells 1801,1802 of FIG. 18 are electrically connected in parallel.

A first electrical conductor 1807 is coupled to each negative terminal 1803,1804. A second electrical conductor 1808 is coupled to each positive terminal 1805,1806. In this illustrative embodiment, the second conductor 1808 is configured to pass across a major face of each cell 1801,1802 in relatively close proximity to the first electrical conductor 1807. This close relationship facilitates a magnetic field 1881 generated by discharge current in the first electrical conductor 1807 to be substantially opposite in magnitude and direction from a magnetic field 1882 generated by discharge current in the second electrical conductor 1808. These fields tend to cancel, thereby reducing the overall magnetic field emissions.

Turning now to FIG. 19, illustrated therein is another embodiment of a side-by-side cell structure configured to reduce magnetic field emissions in accordance with embodiments of the invention. As with FIG. 18, two cells 1901,1902 are disposed side-by-side in a layer with their minor faces abutting. As shown in FIG. 19, the orientation of each cell 1901,1902 is opposite that of FIG. 18. Specifically, the non-label side 1991 of cell 1901 is facing upward, while the label side 1992 of cell 1902 is facing upward. Consequently, while the positive terminals (1805,1806) of FIG. 18 were disposed outside the negative terminals (1803,1804), in FIG. 19 the positive terminals 1905,1906 are disposed within the negative terminals 1903,1904.

The electrical conductors 1907,1908 shown in FIG. 19 are similar to that of FIG. 18. A first electrical conductor 1907 is coupled to each negative terminal 1903,1904 and passes about the end of the layer. A second electrical conductor 1908 is coupled to each positive terminal 1905,1806 and passes across a major face of each cell 1901,1902 in relatively close proximity to the first electrical conductor 1907. This close relationship facilitates the magnetic field generated by discharge currents in the first electrical conductor 1907 to oppose those in the second electrical conductor 1908, thereby reducing the overall magnetic field emissions.

Turning now to FIG. 20, illustrated therein is another embodiment of a side-by-side cell structure configured to reduce magnetic field emissions in accordance with embodiments of the invention. Two cells 2001,2002 are disposed side-by-side in a layer with their minor faces abutting. The cells 2001,2002 are oriented as in FIG. 18, with the label side 2009 of cell 2001 and the non-label side 2010 of cell 2002 is facing upward. The positive terminals 2005,2006 and negative terminals 2003,2004 are disposed on a common side of each cell housing, with the negative terminals 2003,2004 being disposed between the positive terminals 2005,2006.

A first electrical conductor 2007 is coupled to each negative terminal 2003,2004. Rather than being coupled in a straight line between each negative terminal 2003,2004, the first electrical conductor 2007 is configured in a loop 2060 across a major face of cell 2001 such that a leg 2027 of the first electrical conductor 2007 passes atop an electrical tab 2034 disposed within cell 2001. In this configuration, a discharge current flowing in the electrical tab 2031 will be in an opposite direction of a discharge current flowing in the electrical conductor 2007. Accordingly, a magnetic field 2081 generated by discharge current in the first electrical conductor 2007 will be opposite in direction from a magnetic field 2082 generated by discharge current in tab 2031. These opposing fields reduce the overall magnetic field emissions. The first electrical conductor 2007 passes along a layer of insulation 2050 in this illustrative embodiment.

Turning now to FIG. 21, illustrated therein is another embodiment of a side-by-side cell structure configured to reduce magnetic field emissions in accordance with embodiments of the invention. As with FIG. 20, two cells 2101,2102 are disposed side-by-side in a layer with their minor faces abutting. As shown in FIG. 21, the orientation of each cell 2101,2102 is opposite that of FIG. 20. Specifically, the non-label side 2191 of cell 2101 is facing upward, while the label side 2192 of cell 2102 is facing upward. Consequently, while the positive terminals (2005,2006) of FIG. 20 were disposed outside the negative terminals (2003,2004), in FIG. 21 the positive terminals 2105,2106 are disposed within the negative terminals 2103,2104.

The orientation of the cells 2101,2102 in FIG. 21 causes electrical tabs 2131,2132 coupled to the cathodes of the electrode structures to be disposed between the electrical tabs 2133,2134 coupled to the anodes of the electrode structures. This is opposite that shown in FIG. 18. The electrical conductors 2107,2108 shown in FIG. 21 are similar to that of FIG. 20, and pass along an insulation layer 2150.

Turning now to FIG. 22, illustrated therein is another embodiment of a side-by-side cell structure configured to reduce magnetic field emissions in accordance with embodiments of the invention. Two cells 2201,2202 are disposed side-by-side in a layer with their minor faces abutting. The cells 2201,2202 are oriented as in FIG. 21, with the non-label side 2291 of cell 2201 and the label side 2292 of cell 2202 is facing upward. The positive terminals 2205,2206 and negative terminals 2203,2204 are disposed on a common side of each cell housing, with the positive terminals 2206,2206 being disposed between the negative terminals 2203,2204.

As with FIG. 20, a first electrical conductor 2207 is coupled to each negative terminal 2203,2204 and passes along an insulating layer 2250. A second electrical conductor 2208 passes along the insulating layer 2250 in substantially the same path as the first electrical conductor. In this configuration, a discharge current flowing in the first electrical conductor 2207 will be in an opposite direction at substantially the same magnitude as a discharge current flowing in the second electrical conductor 2208. Accordingly, a magnetic field generated by discharge current in the first electrical conductor 2207 will have substantially the same magnitude, but will be opposite in direction, from a magnetic field generated by discharge current in the second electrical conductor 2208. These opposing fields reduce the overall magnetic field emissions.

Figure 23:
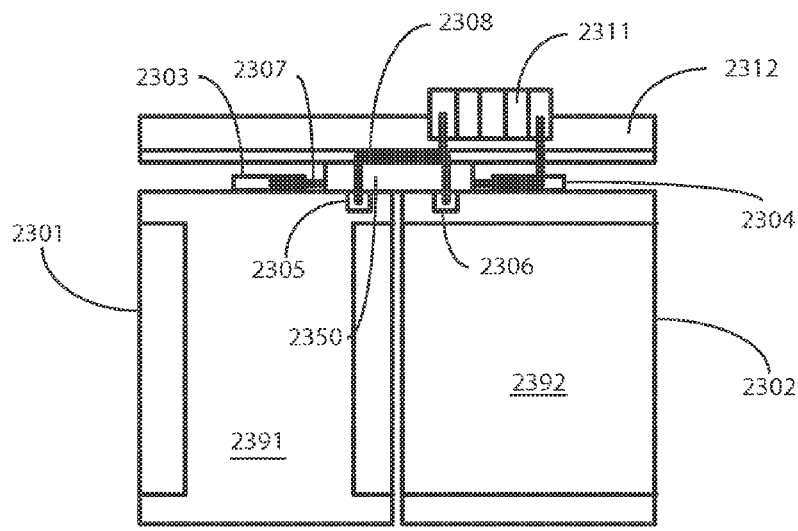

Turning now to FIG. 23, illustrated therein is another embodiment of a side-by-side cell structure configured to reduce magnetic field emissions in accordance with embodiments of the invention. In FIG. 23, the substrate 2312 and terminal block 2311 are on the end of the layer, rather than the side, as was the case in the embodiments of FIGS. 13-22. This enables the electrical conductors 2307,2308 to be shorter.

As shown in FIG. 23, two cells 2301,2302 are disposed side-by-side in a layer with their minor faces abutting. The cells 2301,2302 are oriented as in FIG. 21, with the non-label side 2391 of cell 2301 and the label side 2392 of cell 2302 is facing upward. The first electrical conductor 2307 is coupled to each negative terminal 2303,2304. A second electrical conductor 2308 passes along an insulating layer 2350 atop the first electrical conductor 2307 in substantially the same path as the first electrical conductor 2307. In this configuration, a discharge current flowing in the first electrical conductor 2307 will be in an opposite direction at substantially the same magnitude as a discharge current flowing in the second electrical conductor 2308. Accordingly, a magnetic field generated by discharge current in the first electrical conductor 2307 will have substantially the same magnitude, but will be opposite in direction, from a magnetic field generated by discharge current in the second electrical conductor 2308. These opposing fields reduce the overall magnetic field emissions.

Figure 24:
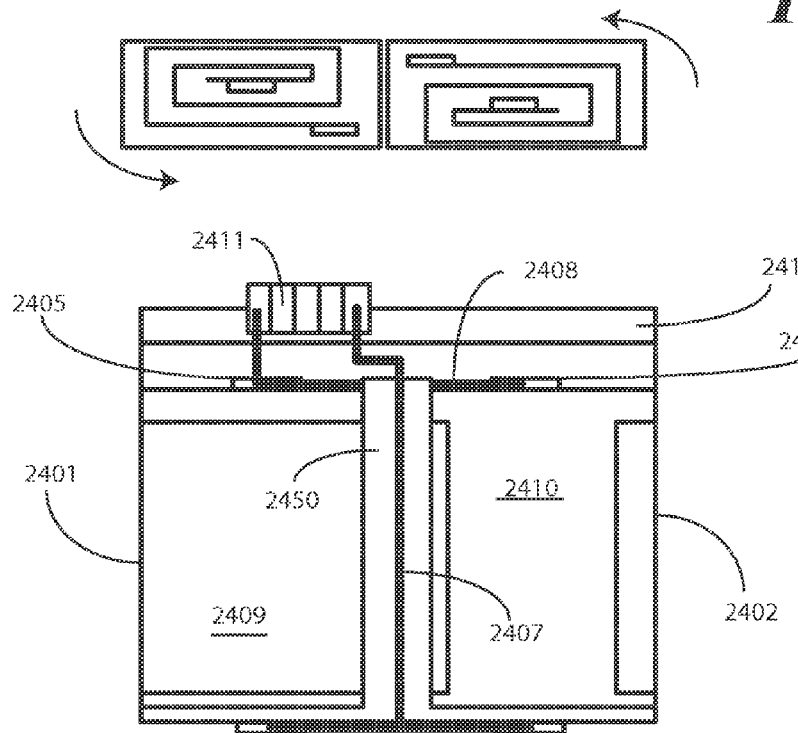

Turning now to FIG. 24, illustrated therein is another embodiment of a side-by-side cell structure configured to reduce magnetic field emissions in accordance with embodiments of the invention. FIG. 24 is similar to FIGS. 22 and 23 in that the substrate 2412 and terminal block 2411 are on the end of the layer, rather than the side. Also, the label side 2409 of cell 2401 and the non-label side 2410 of cell 2402 are facing upward. FIG. 24 differs from FIGS. 22 and 23 in that the positive terminals 2506,2607 are disposed on ends of the cell housing opposite the negative terminals 2403,2404.

To connect the negative terminals 2403,2404 to the terminal block 2411, a first electrical conductor 2407 passes across an insulation layer between each cell 2401,2402. A second electrical conductor 2408 couples each positive terminal 2405,2406 to the terminal block 2411.

Figure 25:
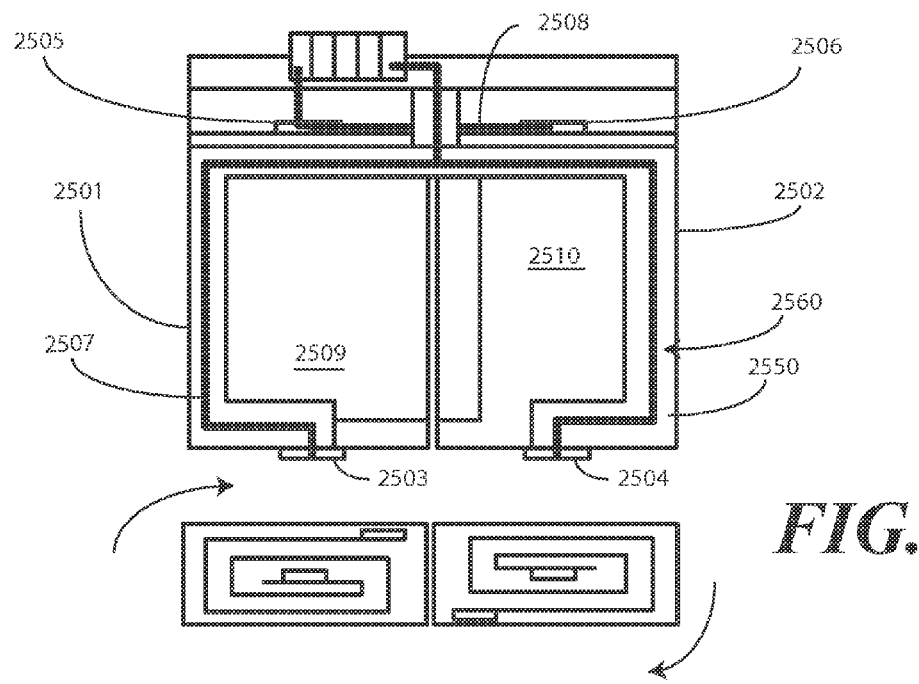

Turning now to FIG. 25, illustrated therein is another embodiment of a side-by-side cell structure configured to reduce magnetic field emissions in accordance with embodiments of the invention. Two cells 2501,2502 are disposed side-by-side in a layer with their minor faces abutting as was shown in FIG. 24. The label side 2509 of cell 2501 is facing upward, while the non-label side 2510 of cell 2502 is facing upward. The positive terminals 2505,2506 are disposed on an opposite side of each cell housing relative to the negative terminals 2503,2504.

A first electrical conductor 2507 is coupled to each negative terminal 2503,2504. Rather than being coupled in a straight line between each negative terminal 2503,2504, the first electrical conductor 2507 is configured in a loop 2560 having a width greater than a distance between the negative terminals 2503,2504. This path, which is disposed atop an insulating layer 2550, works to reduce magnetic field emissions. A second electrical conductor 2508 couples the positive terminals 2505,2506.

Figure 26:
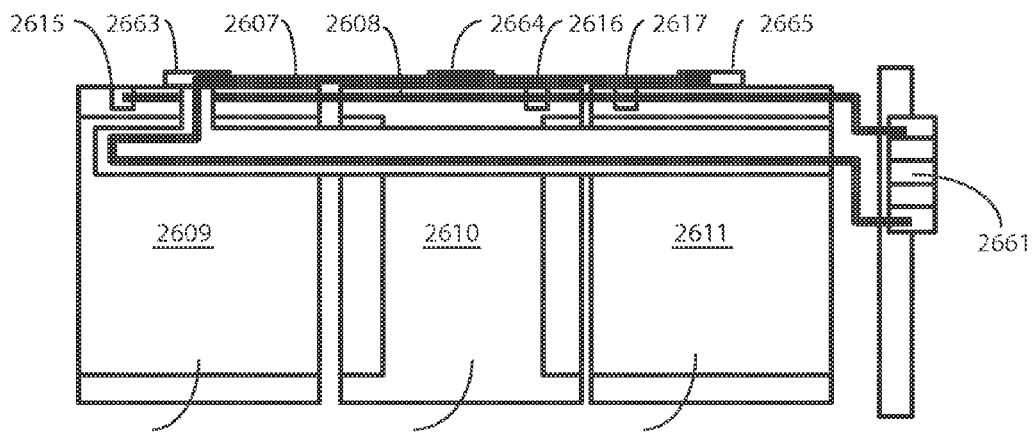

Turning now to FIG. 26, illustrated therein is a three-cell layer configured to reduce magnetic emissions in accordance with embodiments of the invention. As show in FIG. 26, three cells 2601,2602,2603 are arranged in a layer with their minor faces abutting. Cells 2601,2603 have their label sides 2609, 2611 facing upward, while cell 2602 has its non-label side 2610 facing upward. Cell 2602 is the center cell, and is arranged such that its asymmetrical internal electrode construction is opposite that of each adjacent cell.

A first electrical conductor 2607 connects each negative terminal 2663,2664,2665 to a terminal block 2661, and runs about either side of a second electrical conductor 2608 connecting each positive terminal 2615,2616,2617 to the terminal block 2661. By passing the first electrical conductor 2607 about either side of the second electrical conductor 2608, magnetic fields about the second electrical conductor 2608 will be reduced by one leg of the first electrical conductor 2607, thereby reducing the overall magnetic field emissions of the layer.

Figure 27:
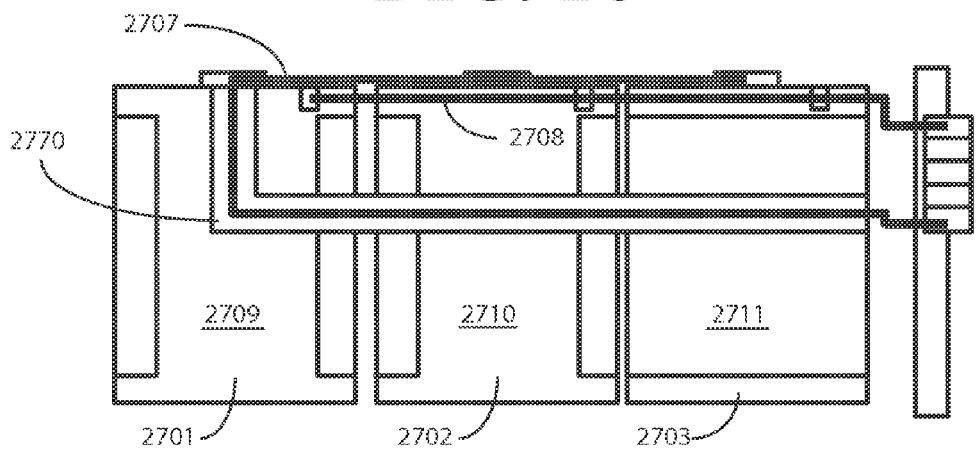

FIG. 27 illustrates a variation of FIG. 26 in that the orientation of each cell 2701,2702,2703 is slightly different from that shown in FIG. 26. In FIG. 27, the three cells 2701,2702, 2703 are arranged in a layer with their minor faces abutting. Cells 2601,2602 have their non-label sides 2709,2710 facing upward, while cell 2603 has its label side 2711 facing upward. Cell 2703 is the right-most cell, and is arranged such that its asymmetrical internal electrode construction is opposite that of each other cell. The routings of the first electrical conductor 2707 and second electrical conductor 2708 are substantially the same as in FIG. 26, with one exception: electrical conductor 2707 is more centrally located along the major faces of the cells 2701,2702,2703 such that a leg 2770 can work to reduce magnetic fields in the left-most cell 2701.

Figure 28:
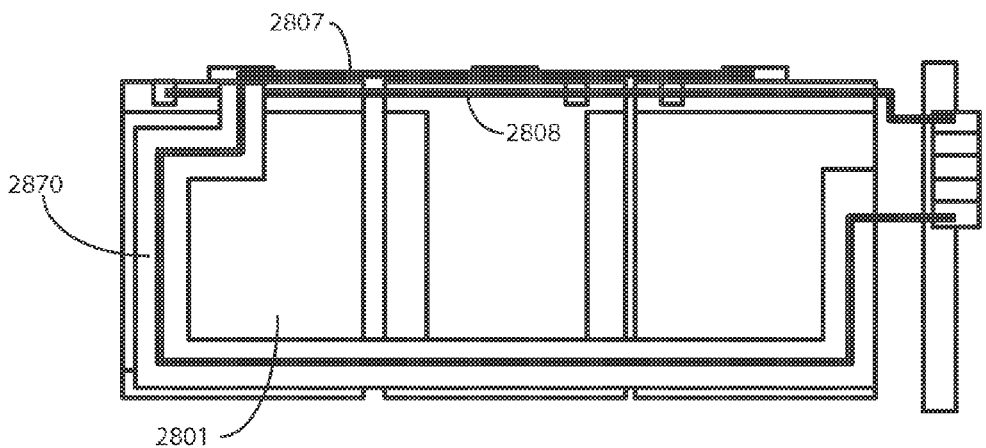
Figure 29:
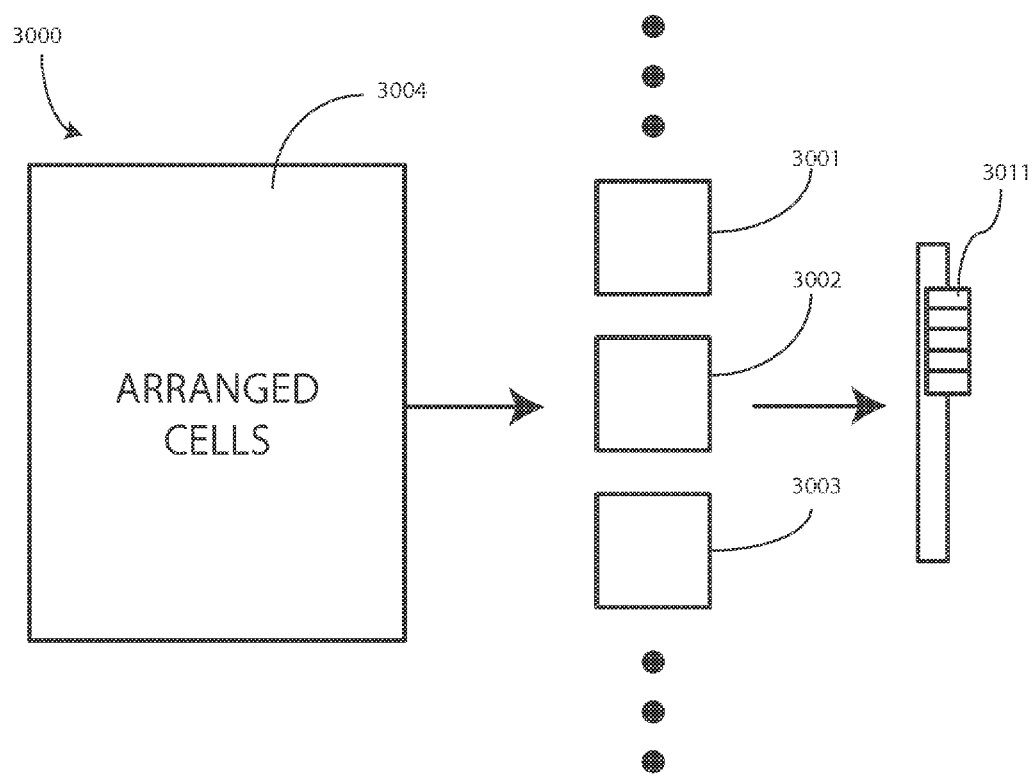

FIG. 28 illustrates a variation of FIG. 26 in that the routing of the first electrical conductor 2807 is farther from the second electrical conductor 2808, and passes about an edge of the layer. This routing allows leg 2870 to reduce magnetic fields generated by tabs disposed within cell 2801.

Figure 29:
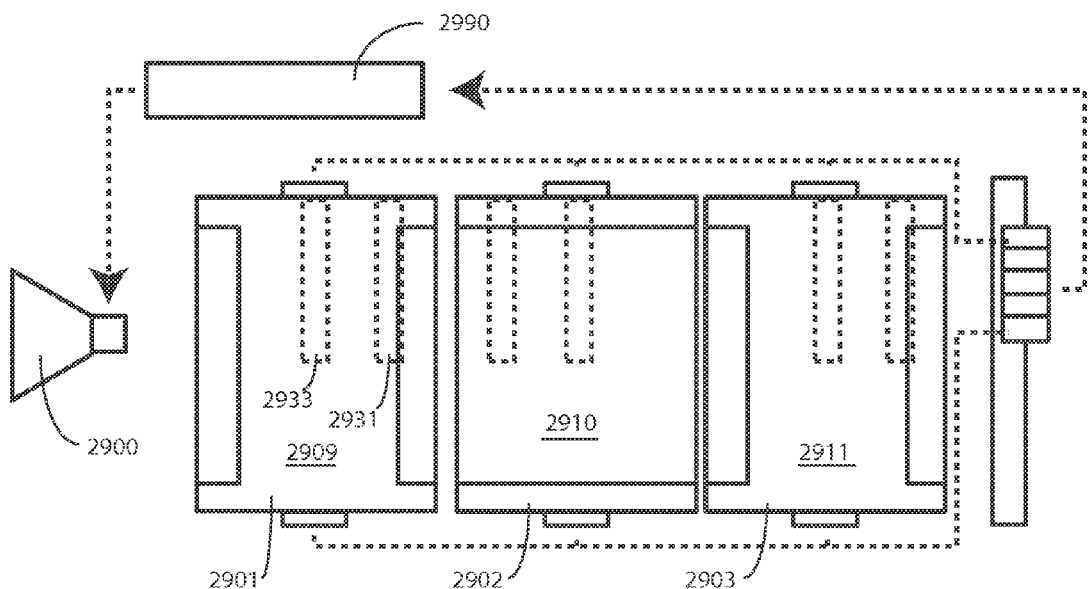
FIG. 29 illustrates one illustrative electronic device employing one illustrative battery pack configured in accordance with one embodiment of the invention.

The embodiments of FIGS. 13-28 each depict examples of cell orientations and conductor routings shown by experimental testing to reduce magnetic field emissions. It will be clear to those of ordinary skill in the art having the benefit of this disclosure that the routing strategies shown in FIGS. 13-28, such as passing electrical conductors across major faces of adjacent cells or between adjacent cells, could equally be applied to the stacked configurations shown in FIGS. 11 and 12. In addition to considering currents flowing in tabs, electrode constructions, and conductors as set forth above, embodiments of the invention can also be configured to work with electronic devices that are particularly susceptible to magnetic field emissions, such as loudspeakers. Turning now to FIG. 29, illustrated therein is one such embodiment.

As shown in FIG. 29, an electromagnetically sensitive device 2900, shown here as a loudspeaker, is powered at least in part by a battery pack made from a plurality of cells. Intermediate drive circuitry 2990 may be coupled between the battery pack and the electromagnetically sensitive device 2900.

As with previous embodiments, the electrical tabs, e.g., tabs 2931,2933, are disposed within the cells 2901,2902,2903 are arranged in a non-symmetrical configuration within a housing of each cell 2901,2902,2903. In FIG. 29, cells 2901, 2903 have their non-label sides 2909,2911 upward, while cell 2902 has its non-label side upward. Accordingly, within each cell a first electrical tab 2933 is centrally disposed within the housing and a second electrical tab 2931 is peripherally disposed within the housing.

To mitigate electromagnetic interference with the electromagnetically sensitive device 2900, the techniques described with reference to FIGS. 13-28 above can be used. To further mitigate interference, another technique can be used. Specifically, as shown in FIG. 29, the cell 2901 closest to the electromagnetically sensitive device 2900 is arranged such that its first electrical tab 2933 disposed between the second electrical tab 2931 and the electromagnetically sensitive device 2900. By moving tab 2931 further from the electromagnetically sensitive device 2900, interference is reduced.

Figure 30:
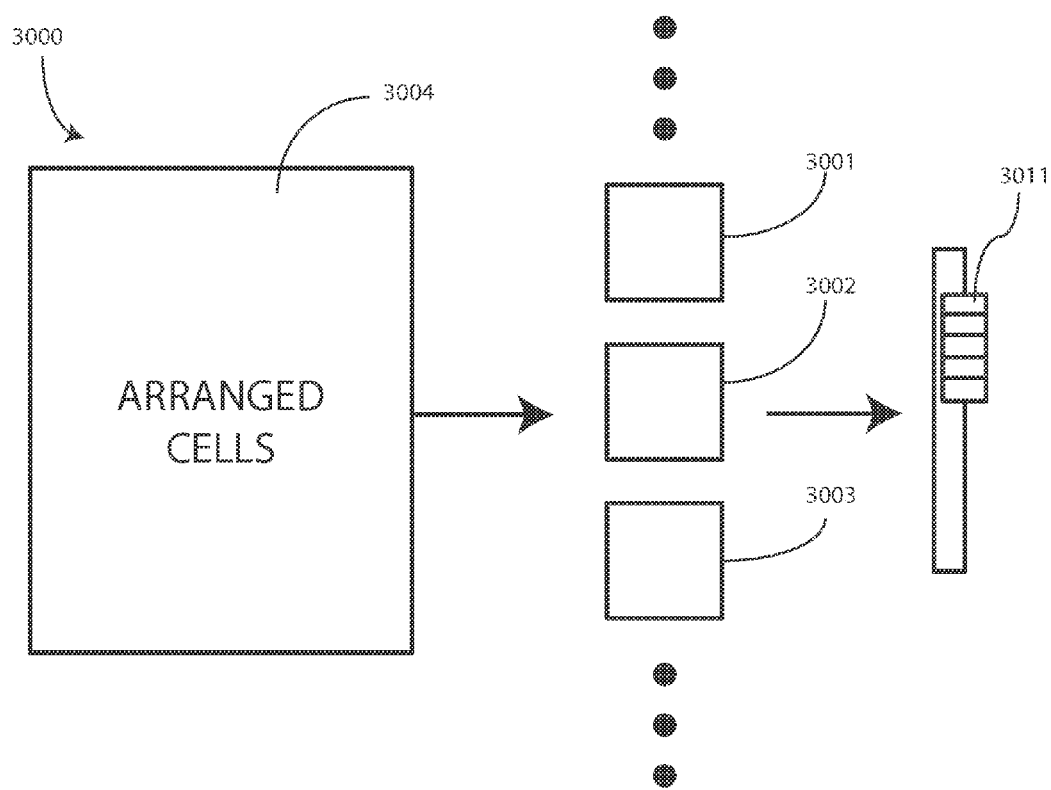
FIG. 30 illustrates a battery pack in accordance with one or more embodiments.

While the battery pack embodiments described above, for ease of discussion, have largely been shown as comprising cells, substrates, and terminal blocks, it will be clear to those of ordinary skill in the art having the benefit of this disclosure that embodiments of the invention may include additional components as well. For example, as shown in FIG. 30, a battery pack 3000 configured in accordance with embodiments of the invention can also include circuitry and components such as one or more of a charging circuit 3001, a fuel gauging circuit 3002, a protection circuit 3003, or other components. The charging circuit 3001 can be used to start, ramp, taper and stop current used to charge the cells 3004. The fuel gauging circuit 3002 can be used to determine how much energy is stored within the cells 3004. The protection circuit 3003 ensures that cell reliability is not compromised by preventing the cells 3004 in the battery pack 3000 from being over or under charged. Typical protection circuits 3003 include voltage and current limits. As such, when the voltage across a cell in the battery pack 3000 becomes too high or too low, the protection circuit 3003 will open switches disposed between the cells 3004 and the terminal block 3011, thereby "turning off" the battery pack 3000. Similarly, if the current flowing either into or out of the cells 3004 gets too high, the protection circuit 3003 will turn off the battery pack 3000. Other devices, such as temperature measurement circuits and indicator circuits may also be included.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A battery pack with reduced magnetic emissions, comprising:
a plurality of cells coupled electrically together, each cell comprising a housing having major and minor faces, and an asymmetrical internal electrode construction having electrical tabs coupled thereto, wherein at least two adjacent cells are arranged with their corresponding asymmetrical internal electrode constructions oriented in different directions;
a first electrical conductor coupled to one of each positive terminal or each negative terminal of the at least two adjacent cells; and
a second electrical conductor coupled to another of the each positive terminal or the each negative terminal of the at least two adjacent cells;
wherein the first electrical conductor is arranged to reduce magnetic field emissions from one or more of the second electrical conductor or one or more of the electrical tabs during discharge of the of the battery pack.

2. The battery pack of claim 1, wherein the at least two adjacent cells are arranged in a layer such that minor faces of the at least two adjacent cells are abutting.

3. The battery pack of claim 2, wherein the layer comprises at least three adjacent cells.

4. The battery pack of claim 3, wherein a center cell of the at least three adjacent cells is arranged such that its asymmetrical internal electrode construction is opposite that of each adjacent cell.

5. The battery pack of claim 2, wherein the battery pack comprises a plurality of layers, each of the plurality of layers arranged such that a first major face of a first layer cell is adjacent to a second major face of a second layer cell.

6. The battery pack of claim 5, wherein the first layer cell and the second layer cell are arranged such that the asymmetrical internal electrode construction of the first layer cell is oriented opposite the asymmetrical internal electrode construction of the second layer cell.

7. The battery pack of claim 1, wherein the each cell further comprises a positive terminal and a negative terminal, wherein the positive terminal is disposed on an opposite side of the housing relative to the negative terminal.

8. The battery pack of claim 1, wherein the each cell further comprises a positive terminal and a negative terminal, wherein the positive terminal and the negative terminal are disposed on a common side of the housing.

9. The battery pack of claim 1, wherein one or more of the first electrical conductor or the second electrical conductor is configured to pass across a major face of one or more of the at least two adjacent cells.

10. The battery pack of claim 9, wherein the at least two adjacent cells are arranged in a layer, further wherein the one or more of the first electrical conductor or the second electrical conductor is configured in a loop having a width greater than a distance between a terminal of a first cell and a corresponding terminal of a second cell in the layer.

11. The battery pack of claim 9, wherein the one or more of the first electrical conductor or the second electrical conductor is configured to pass atop an electrical tab disposed within the one or more of the at least two adjacent cells, wherein a first current flowing in the electrical tab is opposite a second current flowing in the one or more of the first electrical conductor or the second electrical conductor during discharge of the battery pack.

12. A battery pack, comprising: a plurality of cells, each cell comprising:
- an anode;
- a cathode; and
- electrical tabs coupling terminals disposed outside the each cell to the anode and the cathode, respectively;
- wherein the electrical tabs are arranged in a non-symmetrical configuration within a housing of the each cell; and
- electrical conductors coupling the electrical tabs to a terminal block of the battery pack;
- wherein at least two adjacent cells are arranged such that, the electrical tabs coupled to one of cathodes or anodes of the at least two adjacent cells are disposed between the electrical tabs coupled to another of the one of cathodes or the anodes of the at least two adjacent cells; and
- wherein at least one of the electrical conductors is arranged such that current flowing in the at least one of the electrical conductors reduces current flowing in the at least one of the electrical tabs during discharge of the of the battery pack.

13. The battery pack of claim 12, wherein the housing is manufactured from steel, further wherein the one of cathodes or the anodes of the at least two adjacent cells comprises the anodes.

14. The battery pack of claim 12, wherein the housing is manufactured from aluminum, further wherein the one of cathodes or the anodes comprises cathodes.

* * * * *